(12) United States Patent
Maxwell

(10) Patent No.: US 12,103,738 B2
(45) Date of Patent: Oct. 1, 2024

(54) MULTI-FILM THERMOPLASTIC BAGS HAVING GRAB ZONES SECURED TO SIDEWALLS VIA SELFING AND METHODS OF MAKING THE SAME

(71) Applicant: The Glad Products Company, Oakland, CA (US)

(72) Inventor: Jason R. Maxwell, Willowbrook, IL (US)

(73) Assignee: The Glad Products Company, Oakland, CA (US)

( * ) Notice: Subject to any disclaimer, the term of this patent is extended or adjusted under 35 U.S.C. 154(b) by 17 days.

(21) Appl. No.: 17/935,799

(22) Filed: Sep. 27, 2022

(65) Prior Publication Data

US 2023/0159230 A1    May 25, 2023

Related U.S. Application Data

(60) Provisional application No. 63/283,014, filed on Nov. 24, 2021.

(51) Int. Cl.
| | |
|---|---|
| *B65D 33/28* | (2006.01) |
| *B31B 70/26* | (2017.01) |
| *B31B 70/64* | (2017.01) |
| *B32B 3/28* | (2006.01) |
| *B32B 27/08* | (2006.01) |
| *B65D 33/02* | (2006.01) |
| *B65F 1/00* | (2006.01) |
| *B31B 160/10* | (2017.01) |
| *B31B 170/20* | (2017.01) |

(52) U.S. Cl.
CPC .............. *B65D 33/28* (2013.01); *B31B 70/26* (2017.08); *B31B 70/645* (2017.08); *B32B 3/28* (2013.01); *B32B 27/08* (2013.01); *B65D 33/02* (2013.01); *B65F 1/002* (2013.01); *B31B 2160/102* (2017.08); *B31B 2170/20* (2017.08); *B32B 2250/24* (2013.01); *B32B 2439/06* (2013.01)

(58) Field of Classification Search
CPC ............................... B65D 33/28; B65D 33/02
USPC .......................................................... 383/75
See application file for complete search history.

(56) References Cited

U.S. PATENT DOCUMENTS

| | | | |
|---|---|---|---|
| 3,342,666 A | 9/1967 | Hull | |
| 8,888,365 B2 * | 11/2014 | Fraser | B32B 7/14 383/105 |

(Continued)

OTHER PUBLICATIONS

International Search Report & Written Opinion as received in PCT/US2022/077090 dated Dec. 16, 2022.

*Primary Examiner* — Jes F Pascua

(74) *Attorney, Agent, or Firm* — Keller Preece PLLC

(57) ABSTRACT

One or more implementations of a thermoplastic bag with a grab zone of deformations including raised rib-like elements positioned in a high-touch area of the bag. For example, the thermoplastic bag includes a hem skirt non-continuously laminated to a sidewall by one or more raised rib-like elements. The grab zone regions of one or more raised-rib-like elements are located in visible and high-touch areas to provide visual and tactile cues of strength and durability. Moreover, the grab zone regions of one or more raised rib-like elements serve to distribute pull and lift forces across a wider area in order to avoid common failures in high-touch areas such as over stretching, punctures, tears, and rips.

17 Claims, 13 Drawing Sheets

(56) References Cited

U.S. PATENT DOCUMENTS

| | | | |
|---|---|---|---|
| 2012/0063706 A1* | 3/2012 | Fraser | B29C 66/81435 493/243 |
| 2015/0003757 A1* | 1/2015 | Wilcoxen | B32B 37/0076 428/167 |
| 2018/0118415 A1 | 5/2018 | Jean-Mary et al. | |
| 2019/0091966 A1 | 3/2019 | Wilcoxen et al. | |
| 2021/0155379 A1* | 5/2021 | Steenblock | B32B 25/16 |
| 2022/0144516 A1* | 5/2022 | Waldron | B65D 31/02 |
| 2022/0219864 A1* | 7/2022 | Steenblock | B65D 31/02 |
| 2022/0219865 A1* | 7/2022 | Tucker | B31B 70/008 |

* cited by examiner

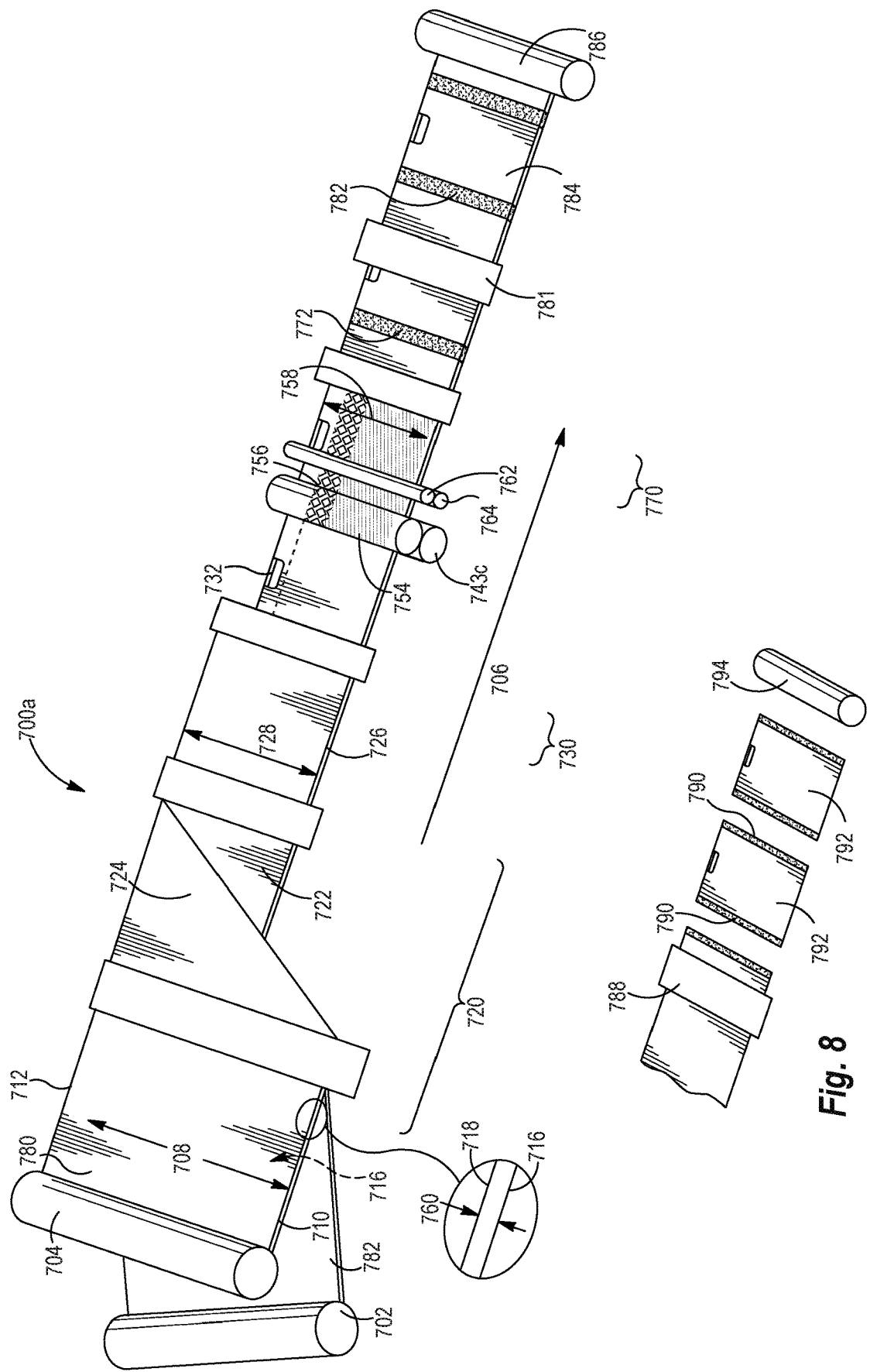

MULTI-FILM THERMOPLASTIC BAGS HAVING GRAB ZONES SECURED TO SIDEWALLS VIA SELFING AND METHODS OF MAKING THE SAME

CROSS-REFERENCE TO RELATED APPLICATIONS

This application claims priority to and benefit of U.S. Provisional Patent Application No. 63/283,014, filed on Nov. 24, 2021, which is incorporated herein by reference in its entirety.

BACKGROUND

1. Technical Field

The present application relates generally to thermoplastic bags. More particularly, the present application relates to thermoplastic bags including multiple films and unique aesthetics.

2. Background and Relevant Art

Thermoplastic films are a common component in various commercial and consumer products. For example, grocery bags, trash bags, sacks, and packaging materials are products that are commonly made from thermoplastic films. Additionally, feminine hygiene products, baby diapers, adult incontinence products, and many other products include thermoplastic films to one extent or another.

The cost to produce products including thermoplastic film is directly related to the cost of the thermoplastic film. Recently the cost of thermoplastic materials has risen. In response, some attempt to control manufacturing costs by decreasing the amount of thermoplastic material in a product. One way manufacturers may attempt to reduce production costs is to stretch the thermoplastic film, thereby increasing its surface area and reducing the amount of thermoplastic film needed to produce a product of a given size.

While stretched, thinner gauge materials can represent cost savings to the manufacturer, the use of thinner gauge films can result in lower durability. Although some recent technology may, in some cases, result in relatively thinner gauge films that may be as strong as their thicker counterparts, customers naturally sense from prior experience that thinner gauge materials are lower in quality and durability.

For example, some cues to a customer of lower quality and durability of a film are how thick or thin the film feels and how thin or weak the film "looks." Customers tend to view thin looking or feeling films as having relatively low strength. This is particularly true when thin looking or feeling films are used in areas of customer products with which the customer comes in direct contact—such as the open end of a trash bag where a customer would gather the bag in order to remove the bag from a trash can.

Thus, even though some mechanisms can improve some aspects of film strength while using a thinner gauge, the look and feel of such films tend to cause customers to believe the film is nevertheless low quality. For example, thinner thermoplastic films are typically more transparent or translucent. Such consumers may feel that they are receiving less value for their money when purchasing products with thinner films; and thus, may be dissuaded to purchase thinner thermoplastic films.

Additionally, as a result of thinner bags, some conventional thermoplastic trash bags are often weak. For example, conventional thermoplastic trash bags including thinner films are generally prone to tearing, ruptures, separations, and other issues at the top of the bag. For example, when grasping a conventional thermoplastic liner by a top portion, a grasping hand (e.g., fingers) can puncture or overly stretch (leading to subsequent failure of) the trash bag. For instance, after fingers stretch a thermoplastic bag during a grasping motion, these overly stretched areas are further compromised (e.g., in some cases to the point of failure) when pulling or lifting a thermoplastic bag and out of a trash receptacle.

Additionally, when a conventional thermoplastic bag includes a draw tape and a corresponding hem channel at the mouth of the bag, the thinner films result in further weaknesses. For example, when such a conventional thermoplastic bag is pulled upward by the draw tape, the resulting force can cause heat seal failure. For instance, the hem seal of conventional thermoplastic bags can fail (e.g., separate or rupture) as a result of upward forces when the bags are pulled up by their draw tapes (e.g., such as when the bags are pulled up out of containers or receptacles). In turn, such compromising of the top of the bags often leads to trash spillage, requiring an adjusted/awkward carrying position or method of the bags, etc.

BRIEF SUMMARY

One or more implementations of the present disclosure solve one or more problems in the art with thermoplastic bags including grab zones with hem skirts laminated to sidewalls of the thermoplastic bags. For example, the hem skirts are laminated to the sidewalls of the thermoplastic bags by a plurality of raised rib-like elements in a strainable network. The raised rib-like elements can help increase elasticity and strength in conventionally weak areas at the top of thermoplastic bags. For example, the raised rib-like elements can increase the elasticity of a grab zone of a thermoplastic bag to help reduce tearing or other damage by stresses/strain from grasping fingers (e.g., during a grabbing motion to lift or carry) applied to the grab zone. Additionally, lamination of the hem skirt to the sidewalls of the thermoplastic bag can also increase the strength of the top of the bag. For example, lamination of the hem skirt to the sidewalls of the thermoplastic bag can reduce stress concentrations in the hem seal associated with lifting the thermoplastic bag by the drawstring and/or provide additional reinforcement of the hem seal. Thus, by laminating the hem skirt via a plurality of raised rib-like elements in a strainable network in the grab zone increases the strength and corresponding quality of the thermoplastic bag.

For example, an implementation of a thermoplastic bag includes thermoplastic film sidewalls. The thermoplastic film sidewalls include hem skirts including folded over top portions of the thermoplastic film sidewalls extending down inner surfaces of the thermoplastic film sidewalls. The thermoplastic film sidewalls also include a plurality of raised rib-like elements in a strainable network, the plurality of raised rib-like elements extending from hem channels toward a bottom of the thermoplastic bag and laminating the hem skirts to the thermoplastic film sidewalls. For example, the plurality of raised rib-like elements are configured to cause the hem skirts to separate from the thermoplastic film sidewalls before the thermoplastic film sidewalls fail when subjected to forces.

Additionally, an implementation of the multi-layer thermoplastic bag include first and second opposing sidewalls joined together along a first side edge, an opposite second side edge, an open top edge, and a closed bottom edge. The multi-film thermoplastic bag further includes the open top edge folded over forming a hem skirt extending down an inner surface of the multi-film thermoplastic bag toward the closed bottom edge. The multi-film thermoplastic bag also includes a plurality of raised rib-like elements in a strainable network laminating the hem skirt to the inner surface of the multi-film thermoplastic bag, the plurality of raised rib-like elements extending from a hem seal toward the closed bottom edge of the multi-film thermoplastic bag.

In addition to the foregoing, a method for making a multi-film thermoplastic bag involves folding a first thermoplastic film and a second thermoplastic film at a top edge to form a hem channel, at least a portion of the first thermoplastic film and the second thermoplastic film extending from the hem channel forming a hem skirt. Additionally, the method includes passing the first thermoplastic film and the second thermoplastic film between a first set of SELF'ing rollers, wherein passing the first thermoplastic film and the second thermoplastic film between the first set of SELF'ing rollers creates one or more raised rib-like elements in a strainable network between a flat portion of the first thermoplastic film, a flat portion of the second thermoplastic film, and the hem skirt, the one or more raised rib-like elements extending from the hem channel over the hem skirt and toward bottom edges of the first thermoplastic film and the second thermoplastic film. The method further includes forming the first and second thermoplastic films into a bag.

Additional features and advantages of will be set forth in the description which follows, and in part will be obvious from the description, or may be learned by the practice of such exemplary implementations. The features and advantages of such implementations may be realized and obtained by means of the instruments and combinations particularly pointed out in the appended claims. These and other features will become more fully apparent from the following description and appended claims, or may be learned by the practice of such exemplary implementations as set forth hereinafter.

BRIEF DESCRIPTION OF THE DRAWINGS

In order to describe the manner in which the above recited and other advantages and features of the present disclosure can be obtained, a more particular description of the present disclosure briefly described above will be rendered by reference to specific implementations thereof which are illustrated in the appended drawings. It should be noted that the figures are not drawn to scale, and that elements of similar structure or function are generally represented by like reference numerals for illustrative purposes throughout the figures. Understanding that these drawings depict only typical implementations of the present disclosure and are not therefore to be considered to be limiting of its scope, the present disclosure will be described and explained with additional specificity and detail through the use of the accompanying drawings in which:

FIG. 8 illustrates a schematic diagram of another process of manufacturing a multi-film thermoplastic bag including a hem skirt laminated to the sidewalls via a SELFing process in accordance with one or more implementations of the present disclosure.

DETAILED DESCRIPTION

Figure 1A:
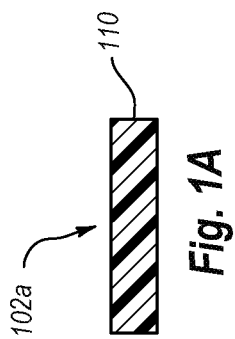
FIG. 1A-1C show partial side cross-sectional views of films having varying numbers of layers according to one or more implementations of the present disclosure.

One or more implementations of the present disclosure include apparatus and methods for creating thermoplastic bags with hem skirts laminated to the sidewalls of the thermoplastic bags via raised rib-like elements in a strainable network. In particular, one or more implementations include a thermoplastic bag including a hem skirt laminated to an inner surface of the thermoplastic bag by raised rib-like elements in a strainable network, where the raised rib-like elements cause delamination between the hem skirt and the thermoplastic bag before one or more thermoplastic films of the thermoplastic bag fail when the thermoplastic bag is subjected to forces (e.g., such as when the thermoplastic bag is pulled out of a receptacle or carried from one location to another).

In particular, one or more implementations include a thermoplastic bag having sidewalls comprising a first thermoplastic film and an adjacent second thermoplastic film. The raised rib-like elements laminate portions of the first thermoplastic film to portions of the second thermoplastic film and vice versa. In one or more implementations, the raised rib-like elements are positioned in a "grab zone" or high-touch area of the thermoplastic bag in order to give the grab zone of the bag a stronger and/or more elastic feel—thus, giving a tactile cue that the bag is less likely to rip, tear, separate, rupture, or puncture when handled in the grab zone.

In one or more implementations, the grab zone including the raised rib-like elements extends from a hem channel. For example, a thermoplastic bag can include a top edge that is folded over to create a hem channel. The top edge may be folded over at a top edge when forming the hem channel and a draw tape may be inserted into a hem channel. In one or more implementations, the folded over top edges of the thermoplastic bag form a hem skirt extending from the hem channel. For example, when the top edge of a thermoplastic bag is folded over toward the inside volume of the bag to create a hem channel, the portions of the top edge that extend from the hem channel down the inside surface of the bag create a hem skirt.

In at least one implementation, the hem channel is secured by a hem seal. In one or more embodiments, the raised rib-like elements are positioned directly below the hem seal in the grab zone and secure and/or lightly laminate the hem skirt to the inside of the thermoplastic bag. Thus, the raised rib-like elements can supplement the hem seal and provide a back-up to the hem seal in the event of unintended low lamination levels in the hem seal.

Moreover, in one or more implementations, the raised rib-like elements in the grab zone of a thermoplastic bag can laminate a surface of the thermoplastic bag to the hem skirt, and vice versa. For example, when the hem skirt extends down an inner surface of a thermoplastic bag, the raised rib-like elements can lightly laminate portions of the one or more films of the thermoplastic bag to each other while further causing light lamination between portions of the hem skirt and at least one surface of the bag (e.g., an inner surface of the bag). In some implementations, the raised rib-like elements cover the entirety of the hem skirt. In other implementations, the raised rib-like elements cover a portion of the hem skirt leaving flat and undeformed areas in one or more portions of the hem skirt.

In some implementations, the hem skirt may include an extended length to form an extended hem skirt. In particular, one or more layers of the hem skirt can extend down from the hem channel to cover at least a portion of the grab zone. An extended hem skirt with two or more layers can reinforce the grab zone by providing additional layers of thermoplastic material, and thereby, reduce puncturing, tearing, or other damage in the grab zone. Furthermore, the raised rib-like elements can secure the extended hem skirt to the layers of the sidewall of the thermoplastic bag. The raised rib-like elements can thus restrict relative movement between the layers in the grab zone, and thereby, provide a sensory signal of increased strength in the grab zone.

In one or more implementations, the methods described herein organize the raised rib-like elements between the films of a multi-film thermoplastic bag into a pattern. For example, the pattern can be continuous or discrete, and can include varying densities of pattern elements. Additionally, the thermoplastic bag may include the pattern of raised rib-like elements over various percentages of the area of the thermoplastic bag (e.g., both within the grab zone and outside of the grab zone). For example, in or more implementations, the raised rib-like elements form a pattern that uniformly spans the grab zone. In alternative implementations, the raised rib-like elements can form a pattern that creates a wavy or uneven bottom edge. The wavy or uneven bottom edge of the pattern creates areas of lower linear force density across the width of the grab zone as compared to a uniform pattern of raised rib-like elements. This can provide lower stress on the material due to a wide distribution of forces from the local application of lift force at the top of the bag when removing the bag from a receptacle.

One or more implementations include thermoplastic films with deformations including raised rib-like elements in strainable networks created by a complex structural elastic-like film (e.g., SELF or SELF'ing) process. The strainable network can comprise a plurality of raised rib-like elements extending in a direction perpendicular to a main surface of the thermoplastic film (i.e., a z-direction). The raised rib-like elements are surrounded by a plurality of web areas. The raised rib-like elements and web areas can comprise a strainable network that provides the thermoplastic film with an elastic-like behavior as well as a tactile feel. U.S. Pat. No. 5,518,801 and U.S. Pat. No. 5,650,214 each disclose processes for forming strainable networks using SELF'ing processes. The contents of each of the aforementioned patents are incorporated in their entirety by reference herein.

Film Materials

As an initial matter, the thermoplastic material of the films of one or more implementations of the present disclosure may include thermoplastic polyolefins, including polyethylene and copolymers thereof and polypropylene and copolymers thereof. The olefin-based polymers may include ethylene or propylene-based polymers such as polyethylene, polypropylene, and copolymers such as ethylene vinyl acetate (EVA), ethylene methyl acrylate (EMA) and ethylene acrylic acid (EAA), or blends of such polyolefins.

Other examples of polymers suitable for use as films in accordance with the present disclosure may include elastomeric polymers. Suitable elastomeric polymers may also be biodegradable or environmentally degradable. Suitable elastomeric polymers for the film include poly(ethylene-butene), poly(ethylene-hexene), poly(ethylene-octene), poly(ethylene-propylene), poly(styrene-butadiene-styrene), poly(styrene-isoprene- styrene), poly(styrene-ethylene-butylene-styrene), poly(ester-ether), poly(ether-amide), poly(ethylenevinylacetate), poly(ethylene-methylacrylate), poly(ethylene-acrylic acid), oriented poly(ethylene-terephthalate), poly(ethylene-butylacrylate), polyurethane, poly(ethylene-propylene-diene), ethylene-propylene rubber, nylon, etc.

Some of the examples and description herein below refer to films formed from linear low-density polyethylene. The term "linear low-density polyethylene" (LLDPE) as used herein is defined to mean a copolymer of ethylene and a minor amount of an olefin containing 4 to 10 carbon atoms, having a density of from about 0.910 to about 0.930, and a melt index (MI) of from about 0.5 to about 10. For example, some examples herein use an octene comonomer, solution phase LLDPE (MI=1.1; p=0.920). Additionally, other examples use a gas phase LLDPE, which is a hexene gas phase LLDPE formulated with slip/AB (MI=1.0; ρ=0.920). Still further examples use a gas phase LLDPE, which is a hexene gas phase LLDPE formulated with slip/AB (MI=1.0; ρ=0.926). One will appreciate that the present disclosure is not limited to LLDPE and can include "high density polyethylene" (HDPE), "low density polyethylene" (LDPE), and "very low-density polyethylene" (VLDPE). Indeed, films made from any of the previously mentioned thermoplastic materials or combinations thereof can be suitable for use with the present disclosure.

Some implementations of the present disclosure may include any flexible or pliable thermoplastic material that may be formed or drawn into a web or film. Furthermore, the thermoplastic materials may include a single layer or multiple layers. The thermoplastic material may be opaque, transparent, translucent, or tinted. Furthermore, the thermoplastic material may be gas permeable or impermeable.

As used herein, the term "flexible" refers to materials that are capable of being flexed or bent, especially repeatedly, such that they are pliant and yieldable in response to externally applied forces. Accordingly, "flexible" is substantially opposite in meaning to the terms inflexible, rigid, or unyielding. Materials and structures that are flexible, therefore, may be altered in shape and structure to accommodate external forces and to conform to the shape of objects brought into contact with them without losing their integrity. In accordance with further prior art materials, web materials are provided which exhibit an "elastic-like" behavior in the direction of applied strain without the use of added traditional elastic materials. As used herein, the term "elastic-like" describes the behavior of web materials which when subjected to an applied strain, the web materials extend in the direction of applied strain, and when the applied strain is released the web materials return, to a degree, to their pre-strained condition.

As used herein, the term "substantially," in reference to a given parameter, property, or condition, means to a degree that one of ordinary skill in the art would understand that the given parameter, property, or condition is met within a degree of variance, such as within acceptable manufacturing tolerances. By way of example, depending on the particular parameter, property, or condition that is substantially met, the parameter, property, or condition may be at least 70.0% met, at least 80.0%, at least 90% met, at least 95.0% met, at least 99.0% met, or even at least 99.9% met.

Additional additives that may be included in one or more implementations include slip agents, anti-block agents, voiding agents, or tackifiers. Additionally, one or more implementations of the present disclosure include films that are devoid of voiding agents. Some examples of inorganic voiding agents, which may further provide odor control, include the following but are not limited to: calcium carbonate, magnesium carbonate, barium carbonate, calcium sulfate, magnesium sulfate, barium sulfate, calcium oxide, magnesium oxide, titanium oxide, zinc oxide, aluminum hydroxide, magnesium hydroxide, talc, clay, silica, alumina, mica, glass powder, starch, charcoal, zeolites, any combination thereof, etc. Organic voiding agents, polymers that are immiscible in the major polymer matrix, can also be used. For instance, polystyrene can be used as a voiding agent in polyethylene and polypropylene films.

One of ordinary skill in the art will appreciate in view of the present disclosure that manufacturers may form the films or webs to be used with the present disclosure using a wide variety of techniques. For example, a manufacturer can form precursor mix of the thermoplastic material and one or more additives. The manufacturer can then form the film(s) from the precursor mix using conventional flat or cast extrusion or co-extrusion to produce monolayer, bilayer, or multilayer films. Alternatively, a manufacturer can form the films using suitable processes, such as, a blown film process to produce monolayer, bilayer, or multilayer films. If desired for a given end use, the manufacturer can orient the films by trapped bubble, tenterframe, or other suitable process. Additionally, the manufacturer can optionally anneal the films thereafter.

An optional part of the film-making process is a procedure known as "orientation." The orientation of a polymer is a reference to its molecular organization, i.e., the orientation of molecules relative to each other. Similarly, the process of orientation is the process by which directionality (orientation) is imposed upon the polymeric arrangements in the film. The process of orientation is employed to impart desirable properties to films, including making cast films tougher (higher tensile properties). Depending on whether the film is made by casting as a flat film or by blowing as a tubular film, the orientation process can require different procedures. This is related to the different physical characteristics possessed by films made by conventional film-making processes (e.g., casting and blowing). Generally, blown films tend to have greater stiffness and toughness. By contrast, cast films usually have the advantages of greater film clarity and uniformity of thickness and flatness, generally permitting use of a wider range of polymers and producing a higher quality film.

When a film has been stretched in a single direction (mono-axial orientation), the resulting film can exhibit strength and stiffness along the direction of stretch, but can be weak in the other direction, i.e., across the stretch, often splitting when flexed or pulled. To overcome this limitation, two-way or biaxial orientation can be employed to more evenly distribute the strength qualities of the film in two directions. Most biaxial orientation processes use apparatus that stretches the film sequentially, first in one direction and then in the other.

In one or more implementations, the films of the present disclosure are blown film, or cast film. Both a blown film and a cast film can be formed by extrusion. The extruder used can be a conventional one using a die, which will provide the desired gauge. Some useful extruders are described in U.S. Pat. Nos. 4,814,135; 4,857,600; 5,076,988; 5,153,382; each of which are incorporated herein by reference in their entirety. Examples of various extruders, which can be used in producing the films to be used with the present disclosure, can be a single screw type modified with a blown film die, an air ring, and continuous take off equipment.

In one or more implementations, a manufacturer can use multiple extruders to supply different melt streams, which a feed block can order into different channels of a multi-channel die. The multiple extruders can allow a manufacturer to form a film with layers having different compositions. Such multi-layer film may later be provided with a complex stretch pattern to provide the benefits of the present disclosure.

In a blown film process, the die can be an upright cylinder with a circular opening. Rollers can pull molten thermoplastic material upward away from the die. An air-ring can cool the film as the film travels upwards. An air outlet can force compressed air into the center of the extruded circular profile, creating a bubble. The air can expand the extruded circular cross section by a multiple of the die diameter. This ratio is called the "blow-up ratio." When using a blown film process, the manufacturer can collapse the film to double the plies of the film. Alternatively, the manufacturer can cut and fold the film, or cut and leave the film unfolded.

In any event, in one or more implementations, the extrusion process can orient the polymer chains of the blown film. The "orientation" of a polymer is a reference to its molecular organization, i.e., the orientation of molecules or polymer chains relative to each other. In particular, the extrusion process can cause the polymer chains of the blown film to be predominantly oriented in the machine direction. The orientation of the polymer chains can result in an increased strength in the direction of the orientation. As used herein predominately oriented in a particular direction means that the polymer chains are more oriented in the particular direction than another direction. One will appreciate, however, that a film that is predominately oriented in a particular direction can still include polymer chains oriented in directions other than the particular direction. Thus, in one or more implementations the initial or starting films (films before being stretched or bonded or laminated in accordance with the principles described herein) can comprise a blown film that is predominately oriented in the machine direction.

The process of blowing up the tubular stock or bubble can further orient the polymer chains of the blown film. In particular, the blow-up process can cause the polymer chains of the blown film to be bi-axially oriented. Despite being bi-axially oriented, in one or more implementations the polymer chains of the blown film are predominantly oriented in the machine direction (i.e., oriented more in the machine direction than the transverse direction).

The films of one or more implementations of the present disclosure can have a starting gauge between about 0.1 mils to about 20 mils, suitably from about 0.2 mils to about 4 mils, suitably in the range of about 0.3 mils to about 2 mils, suitably from about 0.6 mils to about 1.25 mils, suitably from about 0.9 mils to about 1.1 mils, suitably from about 0.3 mils to about 0.7 mils, and suitably from about 0.4 mils and about 0.6 mils. Additionally, the starting gauge of films of one or more implementations of the present disclosure may not be uniform. Thus, the starting gauge of films of one or more implementations of the present disclosure may vary along the length and/or width of the film.

One or more layers of the films described herein can comprise any flexible or pliable material comprising a thermoplastic material and that can be formed or drawn into a web or film. As described above, the film includes a plurality of layers of thermoplastic films. Each individual film layer may itself include a single layer or multiple layers. In other words, the individual layers of the multi-layer film may each themselves comprise a plurality of laminated layers. Such layers may be significantly more tightly bonded together than the bonding provided by the purposely weak discontinuous bonding in the finished multi-layer film. Both tight and relatively weak lamination can be accomplished by joining layers by mechanical pressure, joining layers with adhesives, joining with heat and pressure, spread coating, corona lamination, extrusion coating, ultrasonic bonding, static bonding, cohesive bonding and combinations thereof. Adjacent sub-layers of an individual layer may be coextruded. Co-extrusion results in tight bonding so that the bond strength is greater than the tear resistance of the resulting laminate (i.e., rather than allowing adjacent layers to be peeled apart through breakage of the lamination bonds, the film will tear).

Figure 1B:
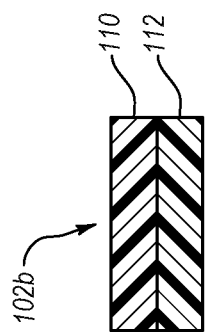
Figure 1C:
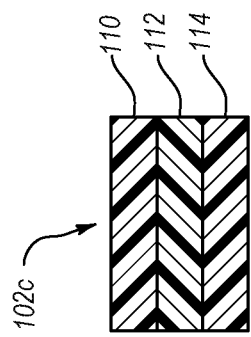

Films described herein may include a single film formed from one, two, three, or more layers of thermoplastic material. FIGS. 1A-1C are partial cross-sectional views of multilayer films into which a complex stretch pattern can be formed. Such films can then be used to form products, such as a thermoplastic bag. In some implementations, the film may include a single layer film 102a, as shown in FIG. 1A, comprising a single layer 110. In other embodiments, the film can comprise a two-layer film 102b as shown in FIG. 1B, including a first layer 110 and a second layer 112. In one or more implementations, the first and second layers 110, 112 are coextruded. In such implementations, the first and second layers 110, 112 may optionally include different grades of thermoplastic material and/or include different additives, including polymer additives. In yet other implementations, a film be a tri-layer film 102c, as shown in FIG. 1C, including a first layer 110, a second layer 112, and a third layer 114. In yet other implementations, a film may include more than three layers. The tri-layer film 102c can include an A:B:C configuration in which all three layers vary in one or more of gauge, composition, color, transparency, or other properties. Alternatively, the tri-layer film 102c can comprise an A:A:B structure or A:B:A structure in which two layers have the same composition, color, transparency, or other properties. In an A:A:B structure or A:B:A structure the A layers can comprise the same gauge or differing gauge. For example, in an A:A:B structure or A:B:A structure the film layers can comprise layer ratios of 20:20:60, 40:40:20, 15:70:15, 33:34:33, 20:60:20, 40:20:40, or other ratios. In one or more implementations, the first, second, and third layers 110, 112 are coextruded.

Figure 2:
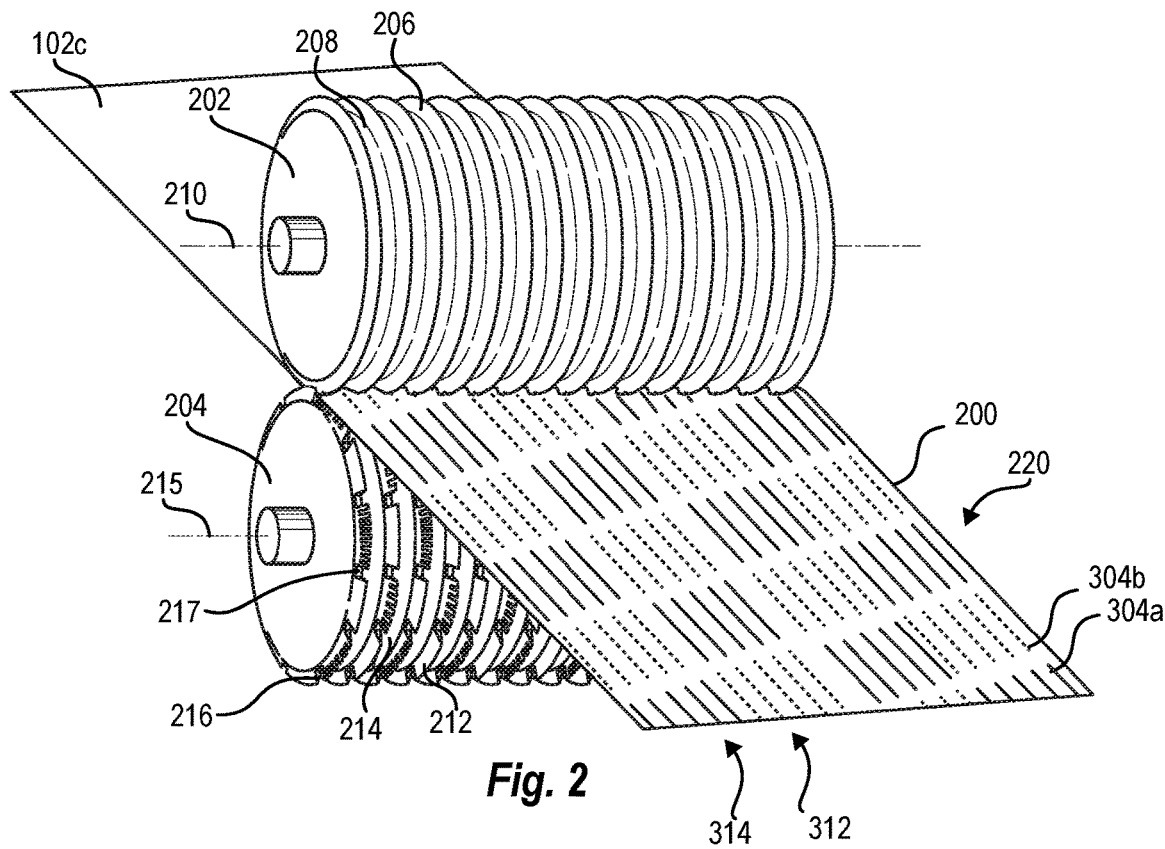
FIG. 2 shows a perspective view of a pair of SELF'ing rollers utilized to form patterns of raised rib-like elements in films according to one or more implementations of the present disclosure.

Typically, the stretchable portion of a strainable network comprises an area that is SELF'ed or stretched by opposing rollers. FIG. 2 shows a pair of SELF'ing rollers 202, 204 (e.g., a portion of a first SELF'ing roller 202 intermeshed with a second SELF'ing roller 204) for creating strainable networks (e.g., SELF'ing deformations) in a pattern. As shown in FIG. 2, the first SELF'ing roller 202 may include a plurality of ridges 206 and grooves 208 extending generally radially outward in a direction orthogonal to an axis of rotation 210.

Additionally, the second SELF'ing roller 204 may include a plurality of ridges 212 and grooves 214 extending generally radially outward in a direction orthogonal to an axis of rotation 215. As further shown in FIG. 2, in some implementations, the ridges 212 of the second SELF'ing roller 204 may include a plurality of teeth 216 and notches 217 that break up the ridges 212. As shown the first SELF'ing roller 202 lacks teeth and/or notches that break up the plurality of ridges 206. As a result, the first SELF'ing roller 202 can be similar to a transverse direction ("TD") intermeshing roller such as the TD intermeshing rollers described in U.S. Pat. No. 9,186,862 to Broering et al., the disclosure of which is incorporated in its entirety by reference herein.

Passing a film (such as the film 102b), through the SELF'ing rollers 202, 204 can produce a thermoplastic film 200 with one or more strainable networks formed by a structural elastic like process in which the raised-rib like elements 304a, 304b of the strainable networks form one or more patterns 220. As used herein, the term "strainable network" refers to an interconnected and interrelated group of regions which are able to be extended to some useful degree in a predetermined direction providing the web material with an elastic-like behavior in response to an applied and subsequently released elongation.

In particular, passing a thermoplastic film between the first SELF'ing roller 202 and the second SELF'ing roller 204 can form a plurality of deformations (e.g., raised rib-like elements) in a thermoplastic film that comprise deformation repeat units that are arranged in one or more patterns. In other words, the SELF'ing rollers 202, 204 can form a pattern of deformation repeat units that correspond to (e.g., have the same shape and size) as repeat units of ridges 212 of the first SELF' ing intermeshing roller.

Figure 3:
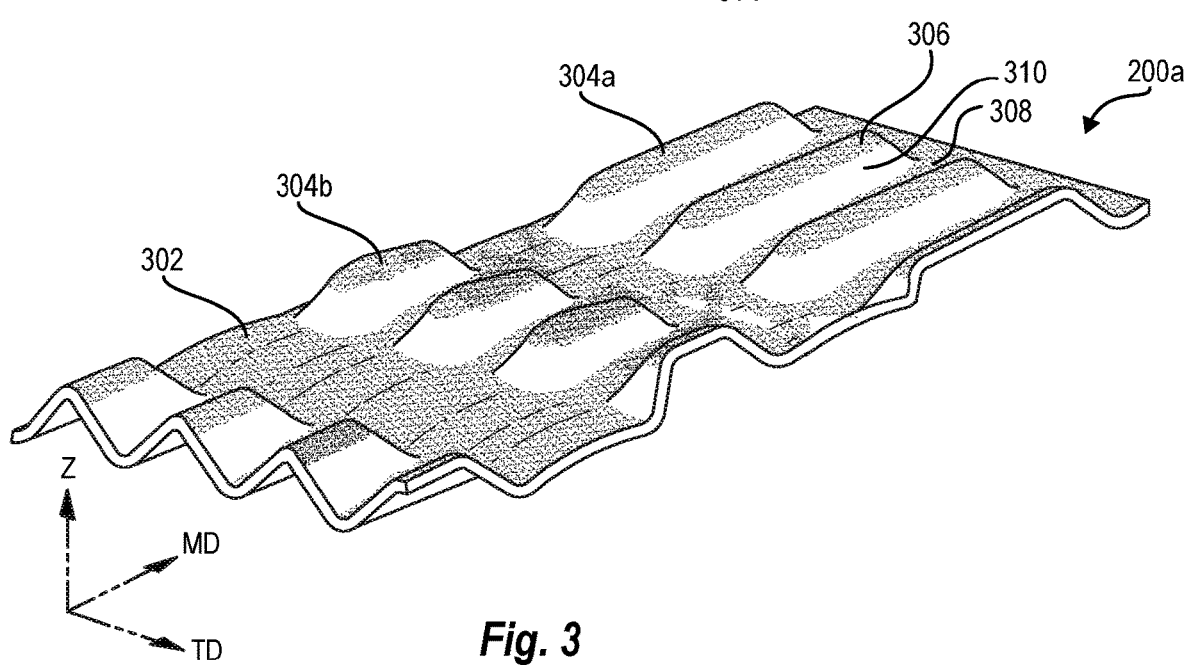
FIG. 3 shows a perspective view of a SELF'ed film having a pattern of raised rib-like elements according to one or more implementations of the present disclosure.

FIG. 3 shows a portion of the thermoplastic film 200 with the pattern 220 of deformations. As the film passes through the SELF'ing rollers 202, 204, the ridges 206, 212 can press a portion of the film out of plane defined by the film to cause permanent deformation of a portion of the film 200 in the Z-direction. For example, the teeth 216 intermittently stretch a portion of the film 200 in the Z-direction. The portions of the film 200 that pass between the notches 217 of the ridges 212 will remain substantially unformed in the Z-direction. As a result of the foregoing, the thermoplastic film 200 includes a plurality of isolated deformed, raised, rib-like elements 304a, 304b and at least one un-deformed portion (or web area) 302 (e.g., a relatively flat region). As will be understood by one of ordinary skill in the art, the length and width of the rib-like elements 304a, 304b depend on the length and width of ridges 206, 212 and the speed and the depth of engagement of the SELF'ing rollers 202, 204. The rib-like elements 304a, 304b and the un-deformed web areas 302 form a strainable network and can be grouped together in deformation repeat units that form various patterns (e.g., a checkboard pattern as shown in FIG. 2 or diamond patterns or other patterns as described in greater detail below).

As shown in FIG. 3, the strainable network of the film 200 can include first thicker regions 306, second thicker regions 308, and stretched, thinner transitional regions 310 connecting the first and second thicker regions 306, 308. The first thicker regions 306 and the stretched, thinner regions 310 can form the raised rib-like elements 304a, 304b of the strainable network. In one or more implementations, the first thicker regions 306 are the portions of the film with the greatest displacement in the Z-direction. In one or more implementations, because the film is displaced in the Z-direction by pushing the rib-like elements 304a, 304b in a direction perpendicular to a main surface of the thermoplastic film (thereby stretching the regions 310 upward) a total length and width of the film does not substantially change when the film is subjected to the SELF'ing process of one or more implementations. In other words, the film 102b (film prior to undergoing the SELF'ing process) can have substantially the same width and length as the film 200 resulting from the SELF'ing process.

As shown by FIG. 3, the rib-like elements have a major axis and a minor axis (i.e., the rib-like elements are elongated such that they are longer than they are wide). As shown by FIG. 3, in one or more implementations, the major axes of the rib-like elements are parallel to the machine direction (i.e., the direction in which the film was extruded). In alternative implementations, the major axes of the rib-like elements are parallel to the transverse direction. In still further implementations, the major axes of the rib-like elements are oriented at an angle between 1 and 89 degrees relative to the machine direction. For example, in one or more implementations, the major axes of the rib-like elements are at a 45-degree angle to the machine direction. In one or more implementations, the major axes are linear (i.e., in a straight line) in alternative implementations the major axes are curved or have otherwise non-linear shapes.

The rib-like elements 304a, 304b can undergo a substantially "geometric deformation" prior to a "molecular-level deformation." As used herein, the term "molecular-level deformation" refers to deformation, which occurs on a molecular level and is not discernible to the normal naked eye. That is, even though one may be able to discern the effect of molecular-level deformation, e.g., elongation or tearing of the film, one is not able to discern the deformation, which allows or causes it to happen. This is in contrast to the term "geometric deformation," which refers to deformations that are generally discernible to the normal naked eye when a SELF' ed film or articles embodying such a film are subjected to an applied load or force. Types of geometric deformation include, but are not limited to bending, unfolding, and rotating.

Thus, upon application of a force, the rib-like elements 304a, 304b can undergo geometric deformation before undergoing molecular-level deformation. For example, a strain applied to the film 200 in a perpendicular to the major axes of the rib-like elements 304a, 304b can pull the rib-like elements 304a, 304b back into plane with the web areas 302 prior to any molecular-level deformation of the rib-like elements 304a, 304b. Geometric deformation can result in significantly less resistive forces to an applied strain than that exhibited by molecular-level deformation.

As mentioned above, the rib-like elements 304a, 304b and the web areas 302 can be sized and positioned so as to create any pattern of deformation repeat units. In one or more implementations, the deformation repeat units are visually distinct from the web areas 302. As used herein, the term "visually distinct" refers to features of the web material which are readily discernible to the normal naked eye when the web material or objects embodying the web material are subjected to normal use.

As mentioned above, the rib-like elements 304a, 304b can provide the film 200 with increased elasticity. In particular, the rib-like elements 304a, 304b can unfold and bend prior to stretching the web areas 302 or the rib-like elements 304a, 304b themselves. As such, areas of the film with larger rib-like elements 304a, 304b and more rib-like elements 304a, 304b can have greater elasticity and can be expanded to greater lengths before molecular deformation. As such, the portions of the thermoplastic film can be tailored to have desired strength and elasticity based on sizing/density of the rib-like elements 304a, 304b.

Figure 4:
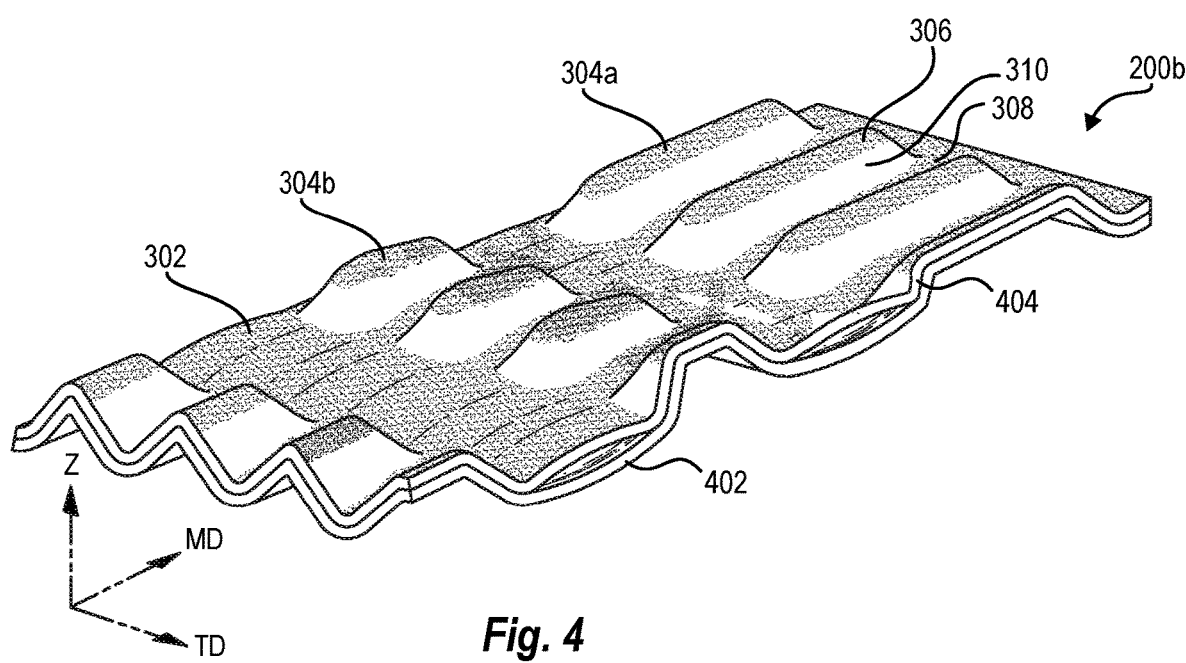
FIG. 4 shows a perspective view of a multi-layer SELF'ed film having a pattern of raised rib-like elements according to one or more implementations of the present disclosure.

In one or more implementations, the films with deformations or raised rib-like elements may comprise two or more distinct portions of one or more thermoplastic films (i.e., a sidewall and a hem skirt). The distinct portions of the films are non-continuously bonded to one another during the creation of the raised-rib like elements. For example, in one or more implementations two film layers can be passed together through a pair of SELF'ing rollers to produce a multi-layered lightly-bonded laminate film 200b, as shown in FIG. 4. The multi-layered lightly-bonded laminate film 200b can comprise a first thermoplastic film 402 (e.g., a hem skirt) discontinuously bonded to a second thermoplastic film 404 (a sidewall). In one or more implementations, the bonds between the first thermoplastic film 402 and the second thermoplastic film 404 are aligned with the first thicker regions 306 and are formed by the pressure of the SELF'ing rollers displacing the raised rib-like elements 304a, 304b. Thus, the bonds can be parallel to the raised rib-like elements 304a, 304b and be positioned between raised rib-like elements 304a, 304b of the first thermoplastic film 402 and the second thermoplastic film 404.

In some implementations, the first and second films 402, 404 may be bonded such that the bonded regions have bond strengths below a strength of the weakest film of the first and second films 402, 404. In other words, the bonded regions may fail (e.g., break apart) before the first or second films 402, 404 fail. As a result, discontinuously bonding the first and second films 402, 404 may also increase or otherwise modify one or more of the tensile strength, tear resistance, impact resistance, or elasticity of the films. Furthermore, the bonded regions between the first and second films 402, 404 may provide additional strength. Such bonded regions may be broken to absorb forces rather than such forces resulting in tearing of the film or causing an adjacent hem seal to fail.

Furthermore, any of the pressure techniques (i.e., bonding techniques) described in U.S. Pat. No. 8,603,609 may be combined with other techniques in order to further increase the strength of the bonded regions while maintaining bond strength below the strength of the weakest layer of the multi-layer laminate film. For example, heat, pressure, ultrasonic bonding, corona treatment, or coating (e.g., printing) with adhesives may be employed. Treatment with a corona discharge can enhance any of the above methods by increasing the tackiness of the film surface so as to provide a stronger lamination bond, but which is still weaker than the tear resistance of the individual layers.

Discontinuously bonding the first and second films 402, 404 together results in un-bonded regions and bonded regions between the first and second films 402, 404. For example, discontinuously bonding the first and second films 402, 404 together may result in un-bonded regions and bonded regions as described in the U.S. Pat. No. 9,637,278, the disclosure of which is incorporated in its entirety by reference herein.

In addition to the foregoing, the first and second film 402, 404 can have differing colors. For example, in one or more implementations, the first film 402 is a translucent or transparent film that is lightly pigmented (e.g., light blue, light green), while the second film 404 is opaque or less transparent that the first film 404. In one or more implementations, the second film 404 can comprise a white color. The contrasting color of the first and second film 402, 404 can create a visual distinction between the bonded areas and the non-bonded areas of the films 402, 404, which in turn and make the deformations and pattern easier to see (e.g., more visually distinct).

More particularly, in one or more implementations involve forming a multi-layer film (e.g., a sidewall with two layers or a sidewall and an extended hem skirt) with a metallic or color that is distinct from the color and appearance of the individual layers of the multi-layer film. For example, a pigmented first layer can have a black appearance while the second layer has a clear or transparent appearance. When bonded together via SELFing to form a multi-layer film in accordance the principles described herein, the resultant multi-layer film can have a metallic, silvery metallic or light grey color rather than a black appearance or color as would be expected. Once such a multi-layer film with a unique appearance is formed, one or more implementations involve bringing regions or areas of the two layers into intimate contact with each other to create visually-distinct regions that have the color or appearance of the pigmented layer (e.g., the bonded raised rib-like elements described above). For example, a multi-layer film with a black first layer and a transparent second layer can have a silver metallic appearance and black visually-distinct regions where the two films are in intimate contact with each other.

In another example, a pigmented first layer can have a black appearance while the second pigmented layer has a white appearance. When combined to form a multi-layer film in accordance the principles described herein, the resultant multi-layer film can have a light grey color rather than a black or white appearance or color as would be expected. Once such a multi-layer film with a unique appearance is formed, one or more implementations involve bringing regions or areas of the two layers into intimate contact with each other to create visually-distinct regions that have the color or appearance of the black pigmented layer or a dark grey appearance. For example, a multi-layer film with a black first layer and a white second layer can have a light grey appearance and black or dark grey visually-distinct regions where the two films are in intimate contact with each other. In one or more embodiment, the amount of pigment in the first layer can determine whether the portions in intimate contact have a black color or a dark grey color.

In one or more embodiments, the first layer comprises a light colorant while the second layer comprises a dark colorant. As used herein a light colorant is a color with a brightness closer to the brightness of white than the brightness of black. As used herein a dark colorant is a color with a brightness closer to the brightness of black than the brightness of white. In one or more embodiments, the first layer has a concentration of light colorant between about 1% by mass and about 15% by mass. More particularly, in one or more embodiments, the first layer has a concentration of light colorant between about 2% by mass and about 12% by mass. In still further embodiments, the first layer has a concentration of light colorant between about 5% by mass and about 10% by mass.

In one or more embodiments, the second layer has a concentration of dark colorant between about 1% by mass and about 15% by mass. More particularly, in one or more embodiments, the second layer has a concentration of dark colorant between about 2% by mass and about 12% by mass. In still further embodiments, the second layer has a concentration of dark colorant between about 5% by mass and about 10% by mass.

One will appreciate in light of the disclosure herein that black and white are used as exemplary colors for ease in explanation. In alternative embodiments, the films can comprise other color combinations such as white over blue, yellow over blue, red over blue, etc.

Figure 5A:
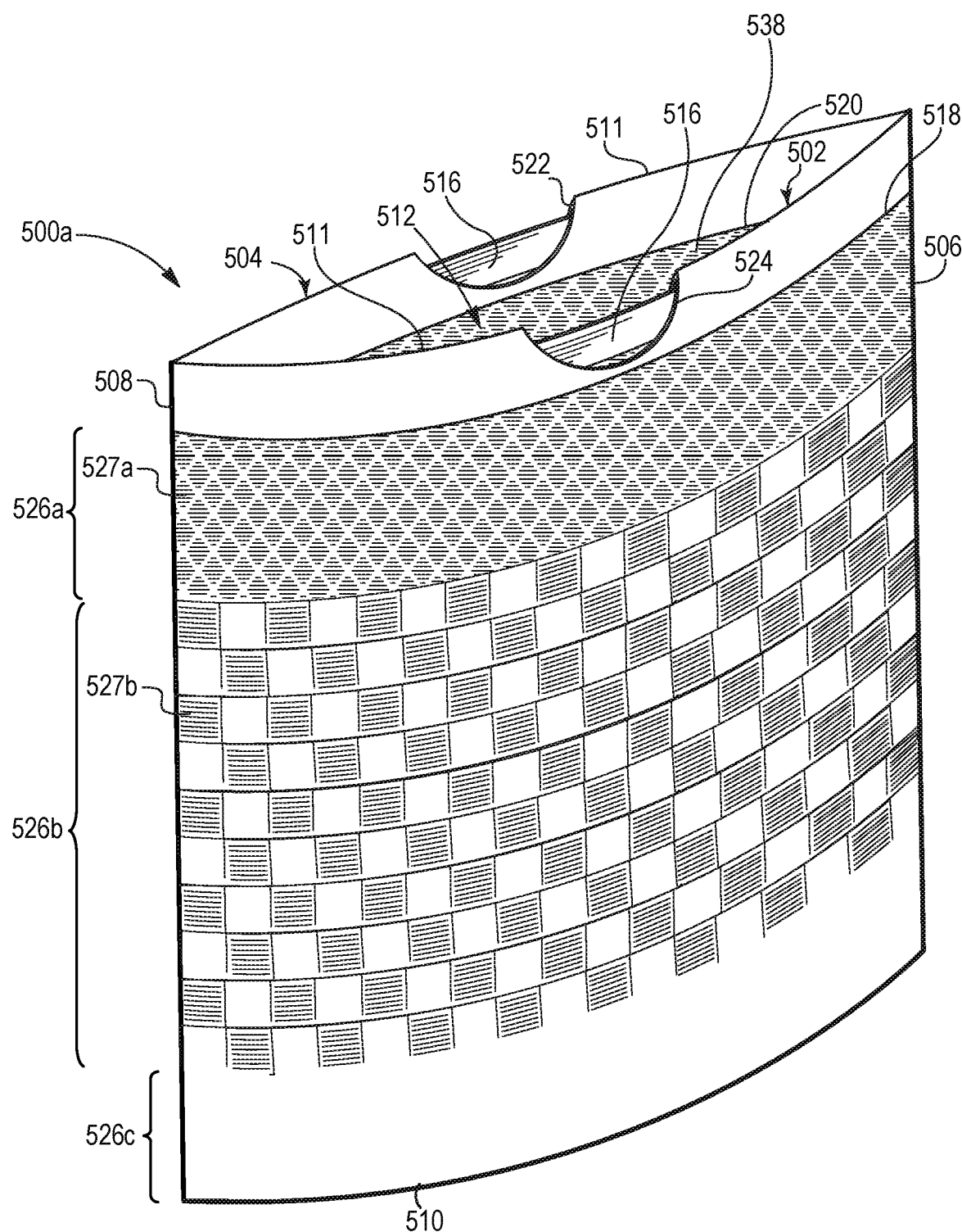
FIG. 5A shows a perspective view of a thermoplastic bag including a hem skirt laminated to the sidewalls via a SELFing process according to one or more implementations of the present disclosure.

FIG. 5A is a perspective view of a thermoplastic bag 500*a* according to an implementation of the present disclosure. The thermoplastic bag 500*a* includes a first sidewall 502 and a second sidewall 504. Each of the first and second sidewalls 502, 504 includes a first side edge 506, a second opposite side edge 508, a bottom edge 510 extending between the first and second side edges 506, 508. Each of the first and second sidewalls 502, 504 also includes a top edge 511 extending between the first and second side edges 506, 508 opposite the bottom edge 510. In some implementations, the first sidewall 502 and the second sidewall 504 are joined together along the first side edges 506, the second opposite side edges 508, and the bottom edges 510. The first and second sidewalls 502, 504 may be joined along the first and second side edges 506, 508 and bottom edges 510 by any suitable process such as, for example, a heated pressure seal. In alternative implementations, the first and second sidewalls 502, 504 may not be joined along the side edges. Rather, the first and second sidewalls 502, 504 may be a single uniform piece. In other words, the first and second sidewalls 502, 504 may form a sleeve or a balloon structure.

In some implementations, the bottom edge 510 or one or more of the side edges 506, 508 can comprise a fold. In other words, the first and second sidewalls 502, 504 may comprise a single unitary piece of material. The top edges 511 of the first and second sidewalls 502, 504 may define an opening 512 to an interior of the thermoplastic bag 500*a*. In other words, the opening 512 may be oriented opposite the bottom edge 510 of the thermoplastic bag 500*a*. Furthermore, when placed in a trash receptacle (e.g., trash can), the top edges 511 of the first and second sidewalls 502, 504 may be folded over the rim of the receptacle.

In some implementations, the thermoplastic bag 500*a* may optionally include a closure mechanism located adjacent to the top edges 511 for sealing the top of the thermoplastic bag 500*a* to form an at least substantially fully-enclosed container or vessel. As shown in FIG. 5A, in some implementations, the closure mechanism comprises a draw tape 516, a first hem seal 518, and a second hem seal 520. In particular, the first top edge 511 of the first sidewall 502 may be folded over into the interior volume and may be attached or secured to an interior surface of the first sidewall 502 by first hem seal 518. Similarly, the second top edge 511 of the second sidewall 504 is folded over into the interior volume and may be attached to an interior surface of the second sidewall 504 by a second hem seal 520. The draw tape 516 extends through hem channels created by the first and second hem seals 518, 520 along the first and second top edges 511.

The hem channel created by the first hem seal 518 includes a first aperture 524 (e.g., notch) extending through the hem channel and exposing a portion of the draw tape 516. Similarly, the hem channel created by the second hem seal 520 includes a second aperture 522 extending through the hem channel and exposing another portion of the draw tape 516. During use, pulling the draw tape 516 through the first and second apertures 522, 524 will cause the top edges 511 to constrict. As a result, pulling the draw tape 516 through the first and second apertures 522, 524 will cause the opening 512 of the multi-film thermoplastic bag 500*a* to at least partially close or reduce in size. The draw tape closure mechanism may be used with any of the implementations of a thermoplastic bag described herein.

In some implementation, each of the sidewalls 502, 504 of the thermoplastic bag 500*a* comprise a multi-film thermoplastic structure, such as that shown in FIG. 4 above. Thus, each sidewall 502, 504 can include at least an inner layer and an outer layer. Indeed, the thermoplastic bag 500*a* can have a bag-in-bag structure. In other words, the thermoplastic bag 500*a* can include a first bag and a second bag positioned therein. More particularly, the first thermoplastic bag can comprise first and second opposing sidewalls joined together along a first side edge, an opposite second side edge, and a closed first bottom edge. The second thermoplastic bag can be positioned within the first thermoplastic bag. The second thermoplastic bag can comprise third and fourth opposing sidewalls joined together along a third side edge, an opposite fourth side edge, and a closed second bottom edge. In one or more implementations, the first thermoplastic bag (e.g., the outer layer) may be pigmented with a first color, and the second thermoplastic bag may be pigmented with a second color (e.g., the inner layer is pigmented with the second color).

As shown in FIG. 5A, the thermoplastic bag 500*a* includes a first region or grab zone 526*a*, a second region 526*b*, and a third region 526*c*. In the implementation shown, the first region 526*a* includes a first pattern 527*a* of deformations including raised rib-like elements in a strainable network (e.g., a SELF'ed pattern). The pattern 527*a* of raised rib-like elements shown in FIG. 5A includes a medium pattern density and exists on the outer and inner surfaces of the first and second sidewalls 502, 504. Additionally, the first region 526*a* covers a portion of the thermoplastic bag 500*a* extending from the first hem seal 518 toward the bottom edge 510 of the thermoplastic bag 500*a*. Additionally, the pattern 527*a* of raised rib-like elements is registered to the same location on the second sidewall 504 of the thermoplastic bag 500*a*. The third region 526*c* of the thermoplastic bag 500*a* is a flat portion of the thermoplastic bag 500*a*.

As shown by FIG. 5A, the pattern 527*a* of raised rib-like elements can comprise a repeating pattern of raised rib-like elements in diamond shapes. In particular, the diamond pattern 527*a* of deformations can include a first plurality of rib-like elements arranged pattern. Portions of the raised rib-like elements of the outer layer can be in direct contact and have the appearance of the inner of the bag 500*a*. The diamond pattern 527*a* of raised rib-like elements in the first region 526*a* (e.g., the grab zone) provide the first region 526*a* with a unique visual appearance that connotes strength. Additionally, as mentioned above, the raised rib-like elements in the grab zone can provide increased elasticity and strength. As such, the raised rib-like elements can provide the grab zone with both a look and feel of increased strength.

While FIG. 5A illustrates a pattern 527*a* of raised rib-like elements in the grab zone (e.g., the first region 526*a*) comprising repeating diamond-shaped elements, other implementations can comprise differently shaped raised rib-like elements and/or patterns of raised rib-like elements. For example, the patterns of raised rib-like elements can include squares, circles, ovals, stars, hexagons, or other shapes. As such, the use of diamond-shaped patterns of raised rib-like elements is for illustrative purpose and does not limit the implementations of the present invention.

In any event, the raised rib-like elements in the grab zone can bond or laminate the hem skirt to the sidewalls 502, 504. Bonding the hem skirt to the sidewalls 502, 504, ensures that the hem skirt stays secured to the sidewalls 502, 504, and thereby, provides an additional layer in the grab zone 526*a*. The additional layer can help ensure that a user does not pierce, rip, or puncture the thermoplastic bag 500*a* in the grab zone when pulling, carrying, or lifting the thermoplastic bag 500*a*. Additionally, the additional bonds between the respective sidewall 502, 504 and the hem skirt provide increased strength to the top of the bag. For example, the additional bonds created by SELFing the hem skirt to the sidewalls can reinforce the hem seals 518, 520. Additional detail regarding the increased strength of the grab zone 526*a* and the rest of the top of the thermoplastic bag 500*a* provided by bonding the hem skirt to the sidewalls 502, 504 will be described in greater detail below. This increased strength in the grab zone 526*a* and at the top of the thermoplastic bag 500*a* is in addition to the increased elasticity associated with SELFing.

In one or more implementations, the second region 526*b* includes a second pattern 527*b* of deformations including raised rib-like elements in a strainable network (e.g., a SELF'ed patterns). For example, as shown in FIG. 5A, the second region 526*b* includes a checkerboard pattern 527*b* of SELF'ed squares as described in International Patent Application No. PCT/US2018/058998 filed on May 16, 2019 and entitled "THERMOPLASTIC FILMS AND BAGS WITH COMPLEX STRETCH PATTERNS AND METHODS OF MAKING THE SAME," hereby incorporated by reference in its entirety.

As shown by FIG. 5A, the checkboard pattern 527*b* of deformations can comprise a repeating pattern of raised rib-like elements. As with the pattern 527*a*, the checkboard pattern 527*b* of deformations can include a first plurality of rib-like elements arranged pattern. Similarly, portions of the raised rib-like elements of the outer layer can be in direct contact and have the appearance of the inner of the bag 500*a*. Both of the patterns 527*a* and 527*b* of raised rib-like elements in the first region 526*a* and the second region 526*b* provide pleasing aesthetics, and visual and tactile cues of strength and durability without substantially changing the length and/or width of the films in the first region 526*a* and the second region 526*b*.

The thermoplastic bag 500*a*, as shown, includes side seals along the side edges 506, 508. As shown, the side heat seals can comprise areas in which all two or more layers of the thermoplastic bag are in intimate contact and sealed together. Heat seals differ from the bonds between the raised rib-like elements in the regions 526*a*, 526*b* in that the heat seals will not separate prior to failure of the thermoplastic films bonded by the heat seals.

In one or more implementations, the bonds between the different layers formed when creating the patterns of raised rib-like elements in the first region 526*a* provides supplementary strength to the hem seals in the thermoplastic bag 500*a*. For example, in one implementation, the bonds at the raised rib-like elements in the first region 526*a* increase the strength of the first hem seal 518 on the first sidewall 502 and the second hem seal 520 on the second sidewall 504 by absorbing some of the force that would typically be applied to the first or second hem seals 518, 520. To illustrate, conventional draw tape thermoplastic bags can experience weakness in the hem seal due to an incomplete seal or other flaw. Thus, in one or more implementations, the bonds of the raised rib-like elements in the first region 526a increase the strength of the potentially weak hem seals near the top of the thermoplastic bag 500a by providing additional force holding the layers together in the grab zone.

Figure 5B:
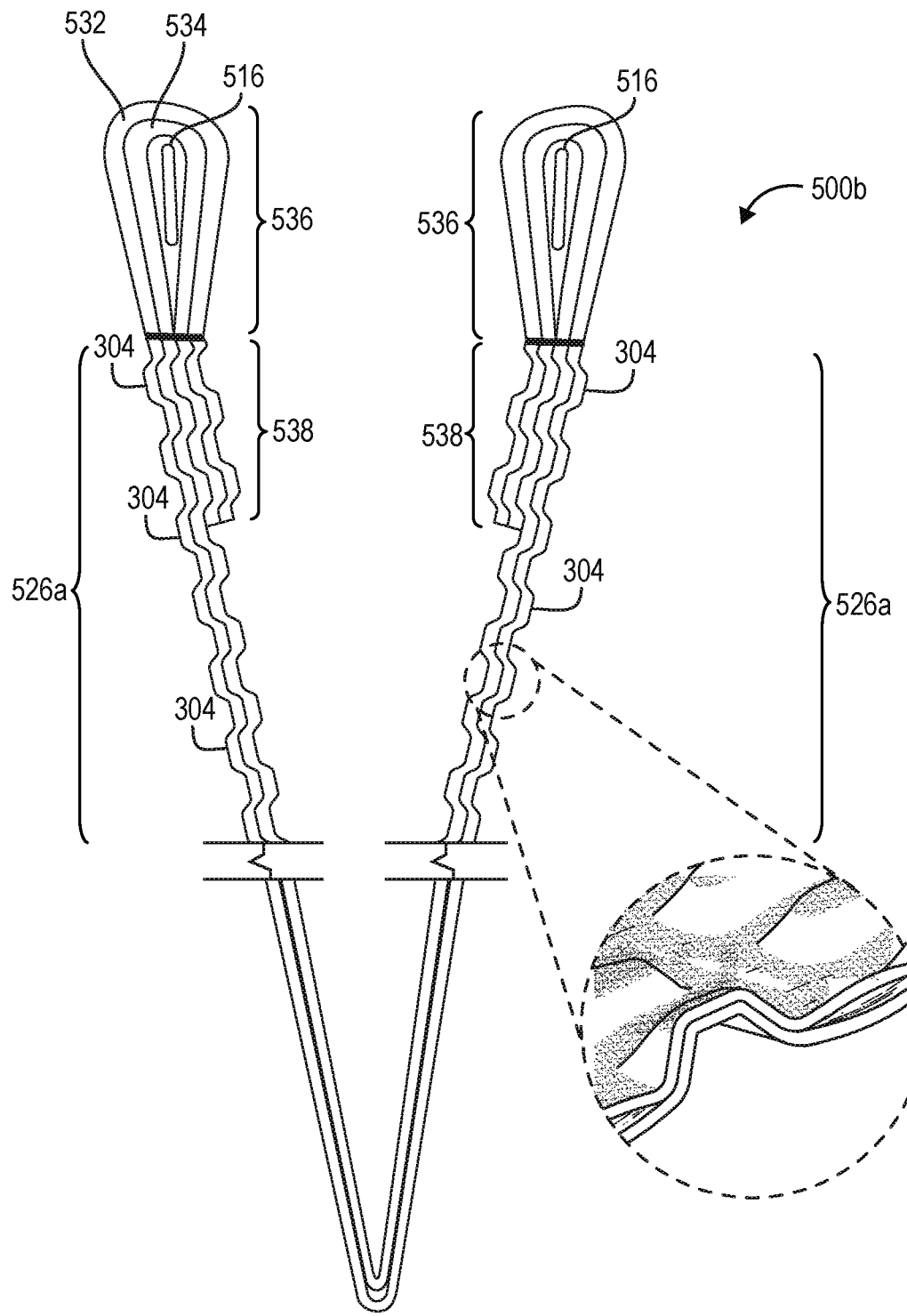
FIG. 5B illustrates a cross-sectional view of the thermoplastic bag of FIG. 5A according to one or more implementations of the present disclosure.
Figure 5C:
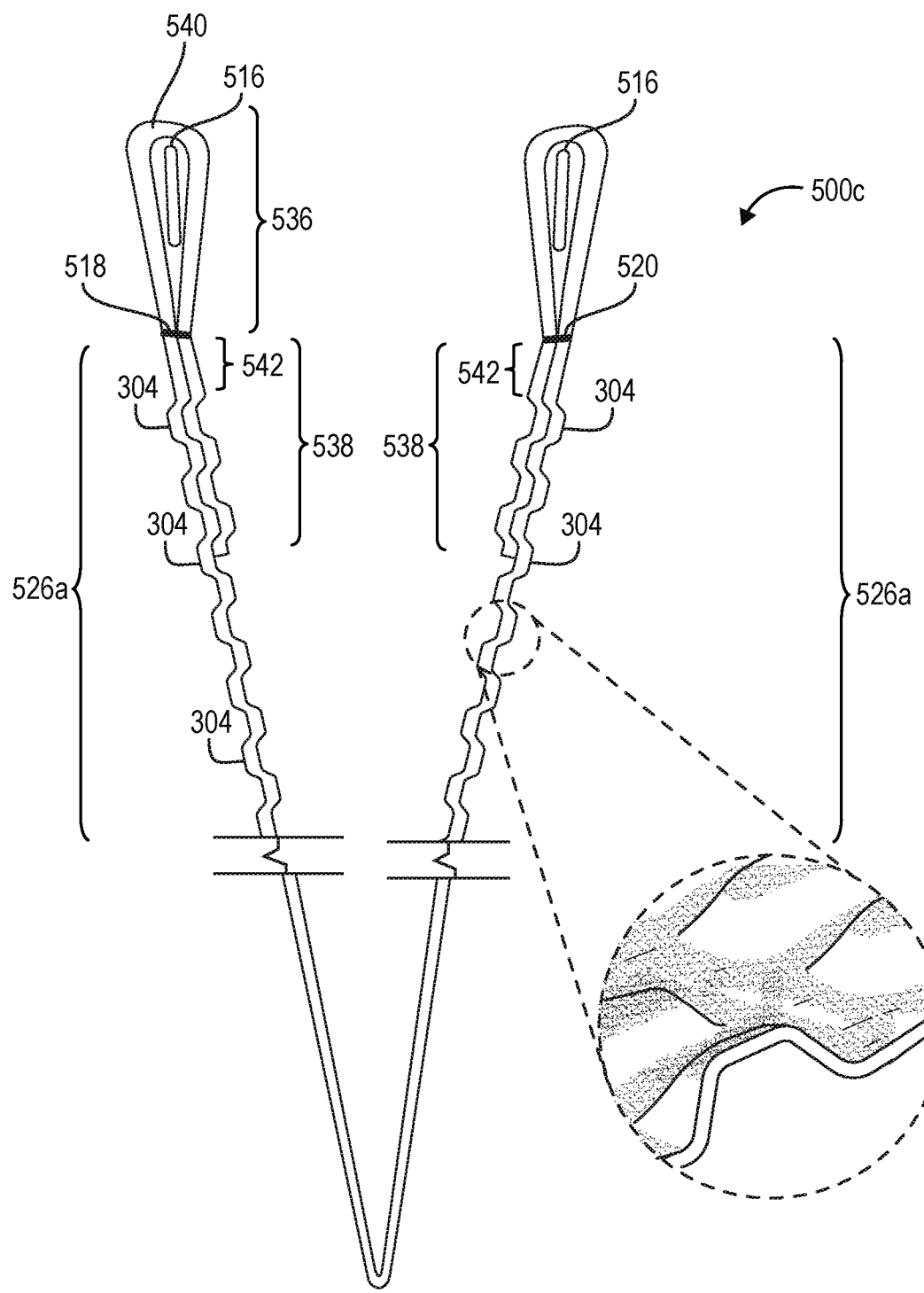
FIG. 5C illustrate a cross-sectional view of the thermoplastic bag of FIG. 5A according to one or more implementations of the present disclosure.

FIGS. 5B and 5C illustrate cross-sectional views of one or more implementations of the thermoplastic bag 500a shown in FIG. 5A. For example, as shown in FIG. 5B, the thermoplastic bag 500b includes an outer first thermoplastic bag 532 and an inner second thermoplastic bag 534 positioned within the first thermoplastic bag 532. The top edges of the first thermoplastic bag 532 and the second thermoplastic bag 534 are folded over the draw tape 516 to form a hem channel 536. In one or more implementations, the draw tape 516 is movable in the hem channel 536 so as to cinch the thermoplastic bag 500b closed when pulled through the first and second apertures 522, 524 (e.g., shown in FIG. 5A above).

As discussed above, the sidewalls of the thermoplastic bag 500b can include at least the first region 526a including SELF'ing between the first thermoplastic bag 532 and the second thermoplastic bag 534. For example, as shown in FIG. 5B, the first region 526a includes raised rib-like elements 304 between the first thermoplastic bag 532 and the second thermoplastic bag 534 where the first thermoplastic bag 532 and the second thermoplastic bag 534 have been lightly laminated via the SELF'ing processes described above.

As further shown in FIG. 5B, folding over the top edges of the first and second bags 532, 534 creates a hem skirt 538 extending down an inner surface of the second thermoplastic bag 534. As shown, the hem skirt 538 includes portions of the first and second bags 532, 534 that are the same length, or that extend the same distance from the hem channel toward the bottom of the bag 500b. The hem skirt 538 may have a length of in a first range of about 0.1 inch (0.254 cm) to about 10 inches (25.4 cm), a second range of about 0.5 inches (1.27 cm) to about 8 inches (20.3 cm), a third range of about 1 inches (2.54 cm) to about 6 inches (15.2 cm), a fourth range of about 3 inches (7.6 cm) to about 6 inches (15.2 cm), a fifth range of about 1.25 inches (3.175 cm) to 2.5 inches (6.35 cm), or a sixth range of 2.5 inches (6.35 cm) to 3 inches (7.6 cm). In one or more implementations, the hem skirt 538 has a length of 2.5 inches (6.35 cm). In another implementation, the hem skirt 538 has a length of 1.25 inches (3.175 cm). In one implementation, the hem skirt 538 has a length of 3 inches (7.6 cm). In another implementation, the hem skirt 538 has a length that is shorter or longer than the examples listed above.

Although FIG. 5B shows the hem skirt 538 including equal lengths of the first and second bags 532, 534, in other implementations the portions of the first and second bags 532, 534 forming the hem skirt 538 can have different lengths. For example, the top edge of the outer first thermoplastic bag 532 can extend a greater length in the hem skirt 538 than the top edge of the inner second thermoplastic bag 534, or vice versa. For instance, the top edge of one bag that may extend a first range of about 0.1 inch (0.254 cm) to about 10 inches (25.4 cm) beyond the top edge of the other bag. In another implementation, the top edge of one bag may extend a second range of about 0.5 inches (1.27 cm) to about 8 inches (20.3 cm) beyond the top edge of the other bag. In another implementation, the top edge of one bag may extend a third range of about 1 inches (2.54 cm) to about 6 inches (15.2 cm) beyond the top edge of the other bag. In yet another implementation, the top edge of one bag may extend a fourth range of about 3 inches (7.6 cm) to about 6 inches (15.2 cm) beyond the top edge of the other bag.

The grab zone or first region 526a may have a length (distance the grab zone extends from the hem channel 536 toward the bottom of the bag 500b) of about 1 inch (2.54 cm) to about 10 inches (25.4 cm), a second range of about 3 inches (7.6 cm) to about 8 inches (20.3 cm), a third range of about 4 inches (10.2 cm) to about 6 inches (15.2 cm), a fourth range of about 3 inches (7.6 cm) to about 6 inches (15.2 cm). In one implementation, the grab zone has a length of 5 inches (12.7 cm). In a further implementation, the grab zone has a length of 4 inches (10.2 cm). In another implementation, the grab zone has a length that is shorter or longer than the examples listed above.

Furthermore, the hem skirt 538 can have a length that is co-extensive or the same length as the grab zone 526a. Alternatively, the hem skirt 538 has a length less than a length of the grab zone 526a. For example, FIG. 5B illustrates that the hem skirt 538 has a length approximately 66% of the length of the grab zone 526a. In alternative implementations, the hem skirt 538 has a length approximately 10%, 20%, 25%, 33%, 50%, 75%, 80% or 90% of the length of the grab zone 526a. In another implementation, the hem skirt 538 has a length that is relatively shorter or longer than the examples listed above compared to the grab zone 526a. For example, in one or more implementations, the hem skirt 538 is longer than the grab zone 526a.

As further shown in FIG. 5B, the raised rib-like elements 304 in the first region 526a extend through the hem skirt 538. For example, in at least one implementation, the raised rib-like elements 304 in the first region 526a are formed after the top edges of the first and second bags 532, 534 are folded over. Thus, the process that forms the raised rib-like elements 304 (e.g., via the SELF'ing rollers 202, 204 shown in FIG. 2 above) also forms raised rib-like elements 304 between the first and second bags 532, 534 or the hem skirt 538, and raised rib-like elements 304 between the sidewalls of the bag 500b and the hem skirt 538. The raised rib-like elements 304 in the hem skirt 538 in combination with the raised rib-like elements 304 in the sidewalls of the thermoplastic bag 500b can create rigidity in the thermoplastic bag 500b in the grab zone 526a that is greater than the rigidity of the thermoplastic bag 500b in the other regions. Furthermore, the SELFing process lightly bonds the hem skirt and layers of the sidewalls together at the raised rib-like elements 304.

While FIG. 5B illustrates a multi-film thermoplastic bag 500b, other implementations can include a single film thermoplastic bag. For example, as shown in FIG. 5C, the thermoplastic bag 500c includes a single thermoplastic bag 540, with top edges folded over the draw tape 516 to form the hem channel 536. In the embodiment illustrated in FIG. 5C, the hem channel 536 is secured or held in place with by the first hem seal 518 and the second hem seal 520.

As further shown in FIG. 5C, folding over the top edge of the single film bag 540 creates the hem skirt 538 extending from the hem seals 518, 520 down an inner surface of the bag 540. The hem skirt 538 may have a length of in a first range of about 0.1 inch (0.254 cm) to about 10 inches (25.4 cm), a second range of about 0.5 inches (1.27 cm) to about 8 inches (20.3 cm), a third range of about 1 inches (2.54 cm) to about 6 inches (15.2 cm), a fourth range of about 3 inches (7.6 cm) to about 6 inches (15.2 cm), a fifth range of about 1.25 inches (3.175 cm) to 2.5 inches (6.35 cm), or a sixth range of 2.5 inches (6.35 cm) to 3 inches (7.6 cm). In one or more implementations, the hem skirt 538 has a length of 2.5 inches (6.35 cm). In another implementation, the hem skirt 538 has a length of 1.25 inches (3.175 cm). In one implementation, the hem skirt 538 has a length of 3 inches (7.6 cm). In another implementation, the hem skirt 538 has a length that is shorter or longer than the examples listed above.

As further shown in the embodiment illustrated in FIG. 5C, the first region 526a may have a flat undeformed area 542 extending from the hem seals 518, 520 across the outer wall of the bag 540 and the hem skirt 538. Additionally, the first region 526a includes raised rib-like elements 304 extending from the flat undeformed area 542 toward a bottom of the bag 540. Accordingly, in at least one implementation, a manufacturing process to form the single thermoplastic bag 540 can fold over the top edge of the single film bag 540 prior to forming the raised rib-like elements 304. The process can further include positioning the SELF'ing rollers such that the raised rib-like elements 304 begin a distance from the hem seals 518, 520, leaving the flat undeformed area 542 in the hem skirt 538.

As mentioned above, the thermoplastic bag 500c of FIG. 5C includes hem seals 518, 520. As such, the bonds securing the hem skirt 538 to the sidewalls of the thermoplastic bag 500c provide supplemental strength to the hem seals 518, 520. In particular, the bonds securing the hem skirt 538 to the sidewalls of the thermoplastic bag 500c can provide increased strength to the top of the thermoplastic bag 500c.

Figure 5D:
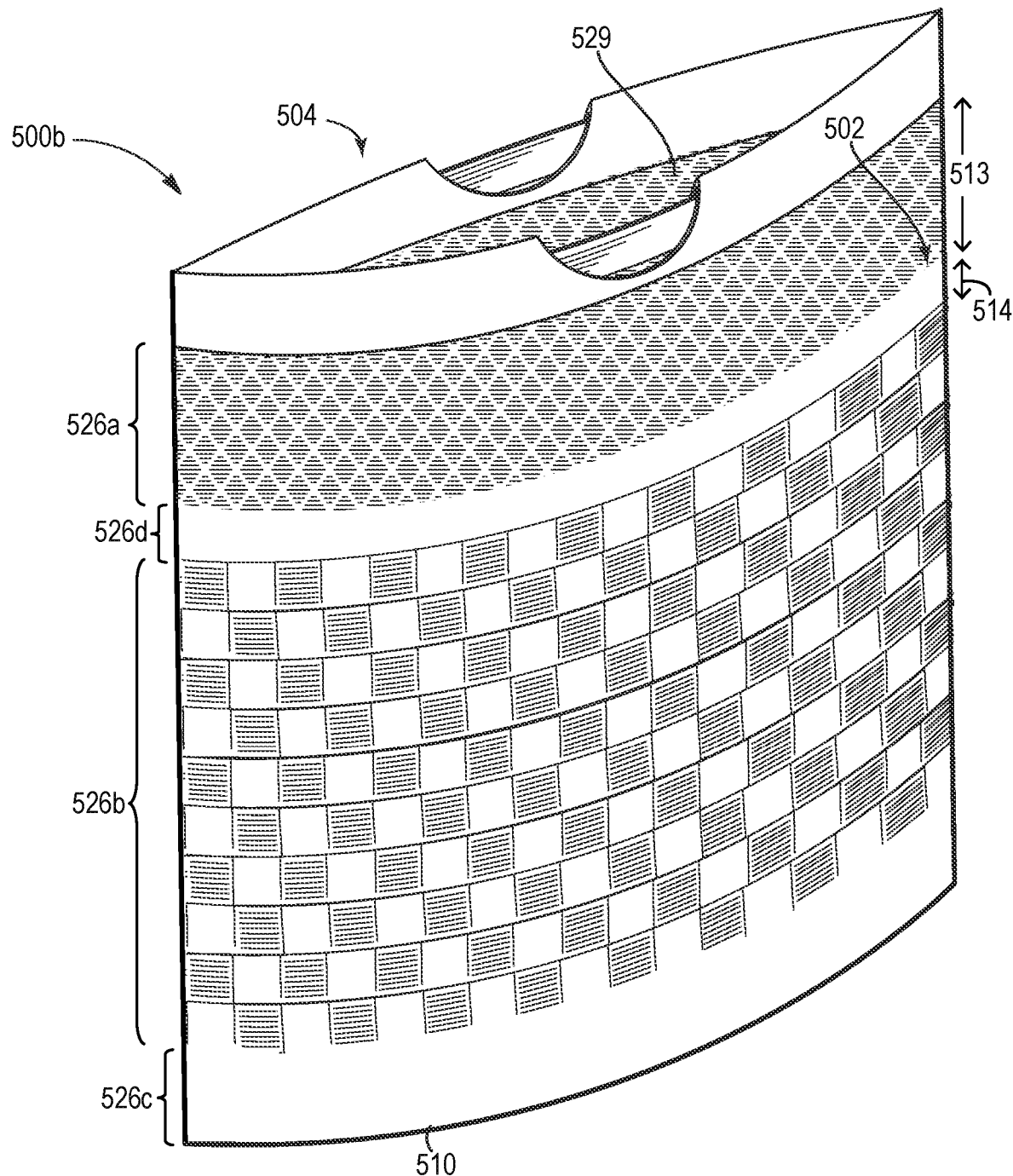
FIG. 5D shows a perspective view of a thermoplastic bag including a hem skirt laminated to the sidewalls via a SELFing process according to one or more additional implementations of the present disclosure.

FIG. 5D illustrates a perspective view of an implementation of a thermoplastic bag 500b (e.g., similar to the thermoplastic bag 500a described above). As shown in FIG. 5D, the thermoplastic bag 500b includes the first sidewall 502 and the second sidewall 504. Each of the sidewalls 502, 504 include the first region 526a, the second region 526b, the third region 526c, and a fourth region 526d. The first region 526a and the second region 526b include deformations such as raised rib-like elements in a strainable network, and the third and fourth regions 526c, 526d include flat and undeformed areas. The fourth region 526d of flat and undeformed areas further highlights the tactile cues connoting strength included in the first region 526a (e.g., the grab zone) by physically and visually separating the first region 526a from the second region 526b.

As further shown in FIG. 5D, the first region 526a extends a first distance 513 from a hem channel toward the bottom edge 510 of the thermoplastic bag 500b. The first distance 513 of the first region 526a ends before the fourth region 526d of flat and undeformed film begins. The fourth region 526d then extends a second distance 514 from the first region 526a that ends before the second region 526b of deformations. In some implementations, the length of the fourth region 526d may be very small (e.g., 1-3 centimeters), while in other implementations, the length of the fourth region 526d may be the same as the length of the first region 526a. In other implementations, the first region 526a, the second region 526b, the third region 526c, and the fourth region 526d may have equal lengths (e.g., approximately 25% of the length of the multi-film thermoplastic bag 500b). In one or more implementations, the fourth region 526d adds to the tactile and visual cues delineating the "grab zone" near the top of the multi-film thermoplastic bag 500b.

Additionally, in one or more implementations, the SELFing pattern is coextensive with the hem skirt 538. In other words, the only portion of the first region 526a including SELFing is the portion with the hem skirt 538. In alternative implementations, the SELFing pattern is coextensive with the hem skirt 538 and extends from the bottom of the hem skirt 538 a distance toward the bottom of the thermoplastic bag as shown in FIGS. 5B and 5C above.

In one or more implementations, one or more raised rib-like elements can be positioned in various portions of a thermoplastic bag. FIGS. 6A, 6B, 6C, and 6D illustrate implementations of a thermoplastic bag with various configurations of raised rib-like elements bonding hem skirts to sidewalls of the thermoplastic bags. The regions of raised rib-like elements (e.g., in various grab zone configurations) illustrated in the implementations of the thermoplastic bag shown in FIGS. 6A-6D provide multiple advantages. For example, the regions of raised rib-like elements serve to evenly distribute pull and lift forces across the top the thermoplastic bag. Thus, the regions of raised rib-like elements reduce puncturing and tearing in association with a grab zone of the thermoplastic bag. Moreover, the regions of raised rib-like elements provide increased strength and elasticity near the hem seals of the thermoplastic bags illustrates in FIGS. 6A-6D. Additionally, the lamination of layers in the grab zone created by the SELFing can provide additional strength to the hem seal, particularly in instance where the hem seal is weak or flawed. As such, the grab zones of raised rib-like elements illustrated in FIGS. 6A-6D provide both the look and feel of increased strength in areas of the thermoplastic bag most likely to be handled by a user.

Figure 6A:
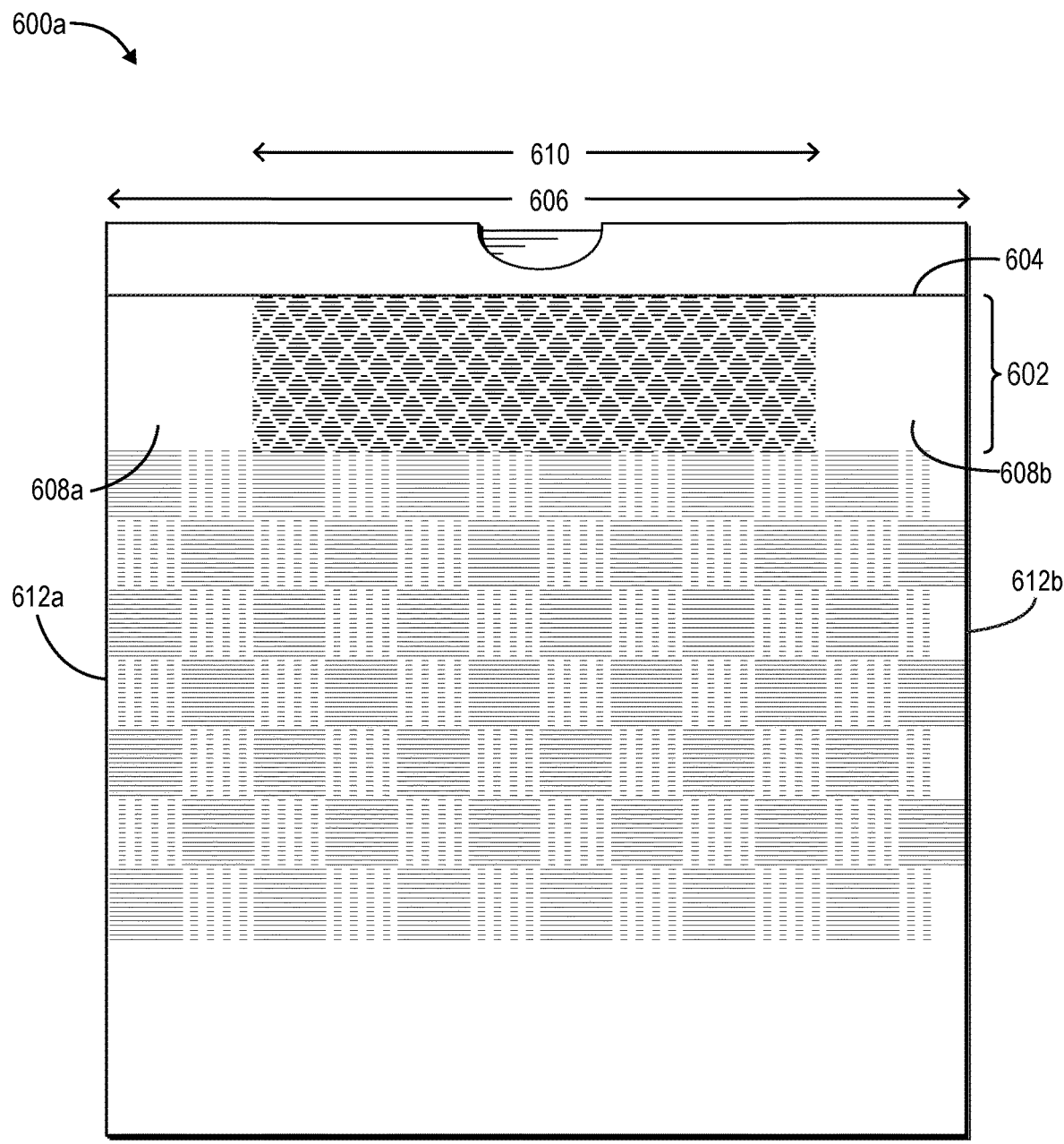
FIGS. 6A-6D show front views of thermoplastic bags including a hem skirt laminated to the sidewalls via a SELFing process according to one or more implementations of the present disclosure.

For example, as shown in FIG. 6A, a thermoplastic bag 600a includes a first region 602 of raised rib-like elements extending from the hem seal 604. The raised rib-like elements extend a first width 610 across the first region 602 that is less than a second width 606 of the thermoplastic bag 600a. The difference between the first width 610 and the second width 606 leaves flat and undeformed areas 608a, 608b in the first region 602. The flat and undeformed areas 608a, 608b are between the raised rib-like elements and first and second side edges 612a, 612b, respectively. In alternative implementations, the raised rib-like elements can extend from one of the first or second side edges 612a, 612b, such that there is only one flat and undeformed area in the first region 602. Additionally, the first width 610 of the raised rib-like elements may be any percentage of the second width 606 of the thermoplastic bag 600a. Accordingly, in one or more implementations, the raised rib-like elements may only extend through non-contiguous regions of an inner circumference of a hem skirt extending down an inner surface of the thermoplastic bag 600a.

Figure 6B:
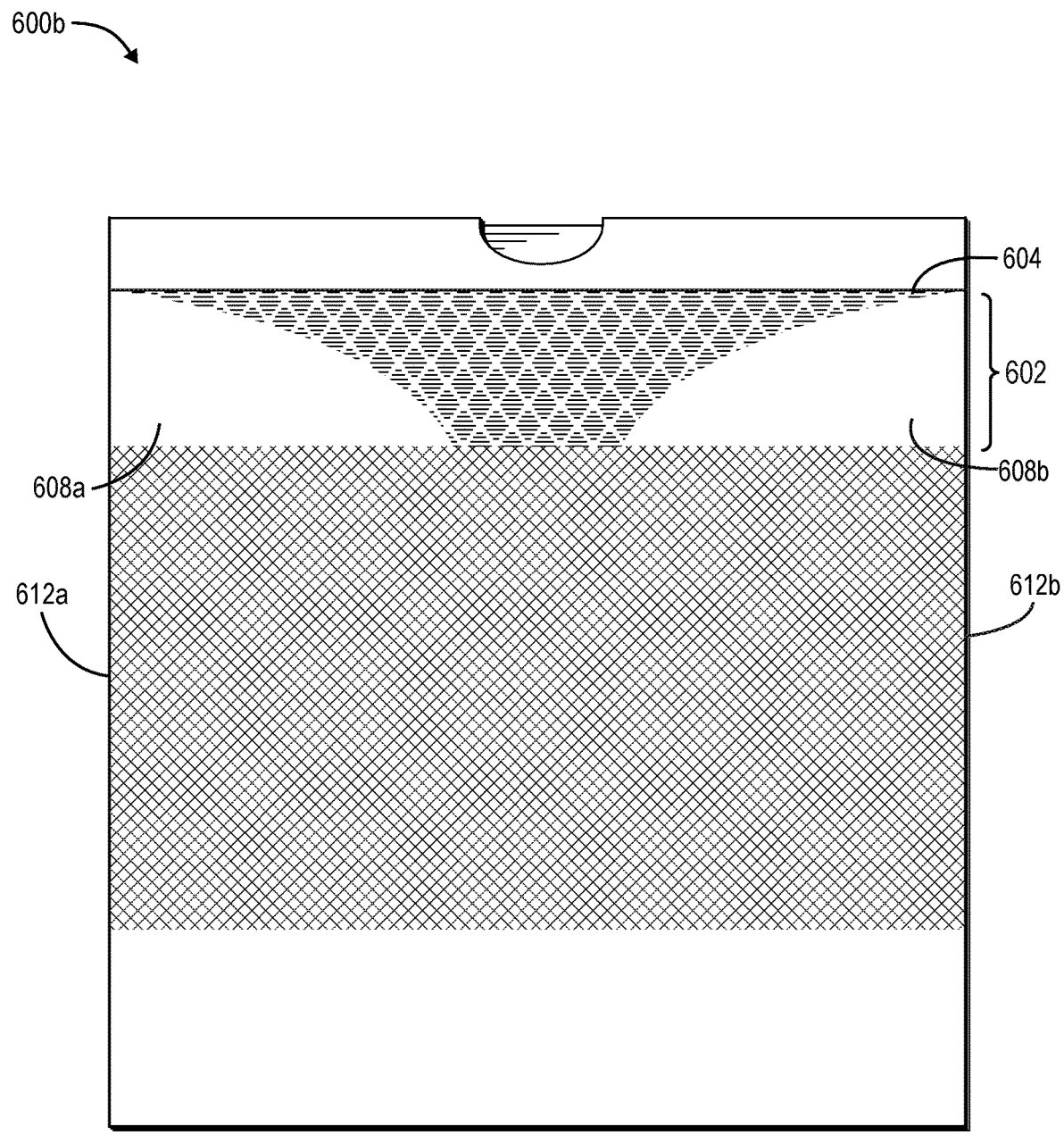

FIG. 6B shows the thermoplastic bag 600b with the first region 602 extending from the hem seal 604. As shown, the raised rib-like elements in the first region 602 extend in a pattern from the hem seal such that the flat and undeformed areas 608a, 608b in the first region 602 have non-rectangular sides. In other words, the flat and undeformed areas 608a, 608b have straight edges (e.g., along the first and second side edges 612a, 612b of the thermoplastic bag 600b), and sloped edges (e.g., along the raised rib-like elements). In additional implementations, the raised rib-like elements can extend from the hem seal 604 in any pattern throughout the first region 602, such that the flat and undeformed areas 608a, 608b can occupy any percentage of the first region 602. Additionally, the raised rib-like elements can simultaneously extend from the hem seal 604 and one of the first or second side edges 612a, 612b such that there is only one flat and undeformed area in the first region 602.

Figure 6C:
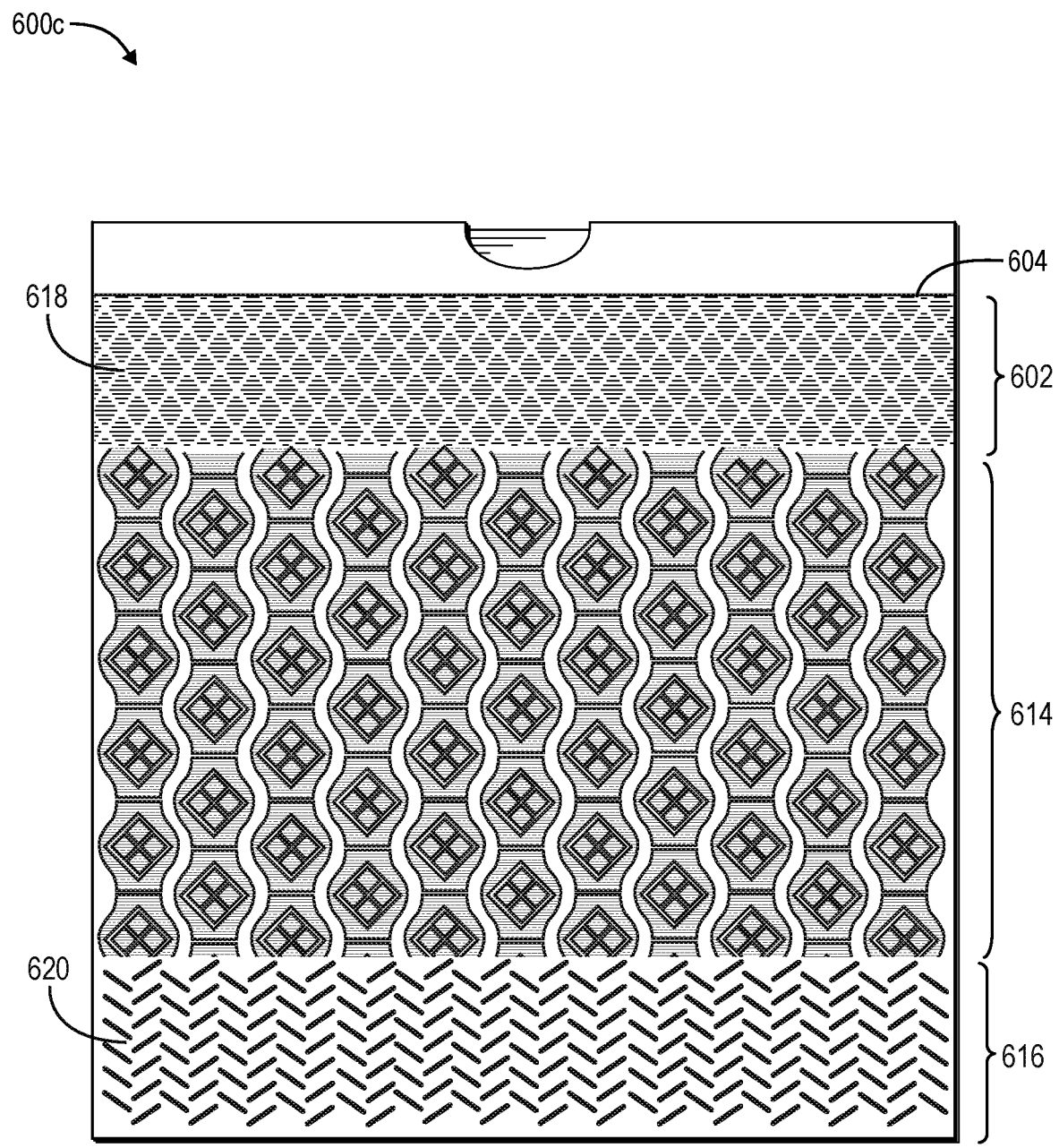

FIG. 6C shows another implementation of the thermoplastic bag 600c with an additional type of non-continuous lamination in a second region 614. For example, the thermoplastic bag 600c includes a first region 602 including a first pattern 618 of raised rib-like elements. The thermoplastic bag 600c also includes a third region 616 including a second pattern 620 of contact areas (e.g., portions of a first thermoplastic film that are in intimate contact with portions of a second thermoplastic film and vice versa without any thinning or deformation of either the first or the second thermoplastic film). In the implementation shown, the first region 602 of raised rib-like elements may function as a "grab zone," while the third region 616 of contact areas may function as reinforcement for the bottom of the thermoplastic bag 600c.

The first region 602 and the third region 616 are separated by the second region 614 including a plurality of deformations (e.g., SELF'ing) in a different pattern than those in the first region 602. As shown, the second region 614 includes a pattern of elements that includes diamonds and wavy lines. Additionally, the pattern of raised rib-like elements can take up any percentage of the second region 614. In particular, the second region 614 includes a SELF'ing pattern of bulbous areas with nested diamonds. Wavy land areas separate the SELF'ing patterns. In some implementations, the wavy land areas may be contact areas in addition to the contact areas in the first region 602. In particular, the techniques described in International Patent Application No. PCT/US2018/058998 filed on May 16, 2019 and entitled "THERMOPLASTIC FILMS AND BAGS WITH COMPLEX STRETCH PATTERNS AND METHODS OF MAKING THE SAME," hereby incorporated by reference in its entirety. In other implementations, the first region 602, the second region 614, and the third region 616 can be in any order on the multi-film thermoplastic bag 600c.

Figure 6D:
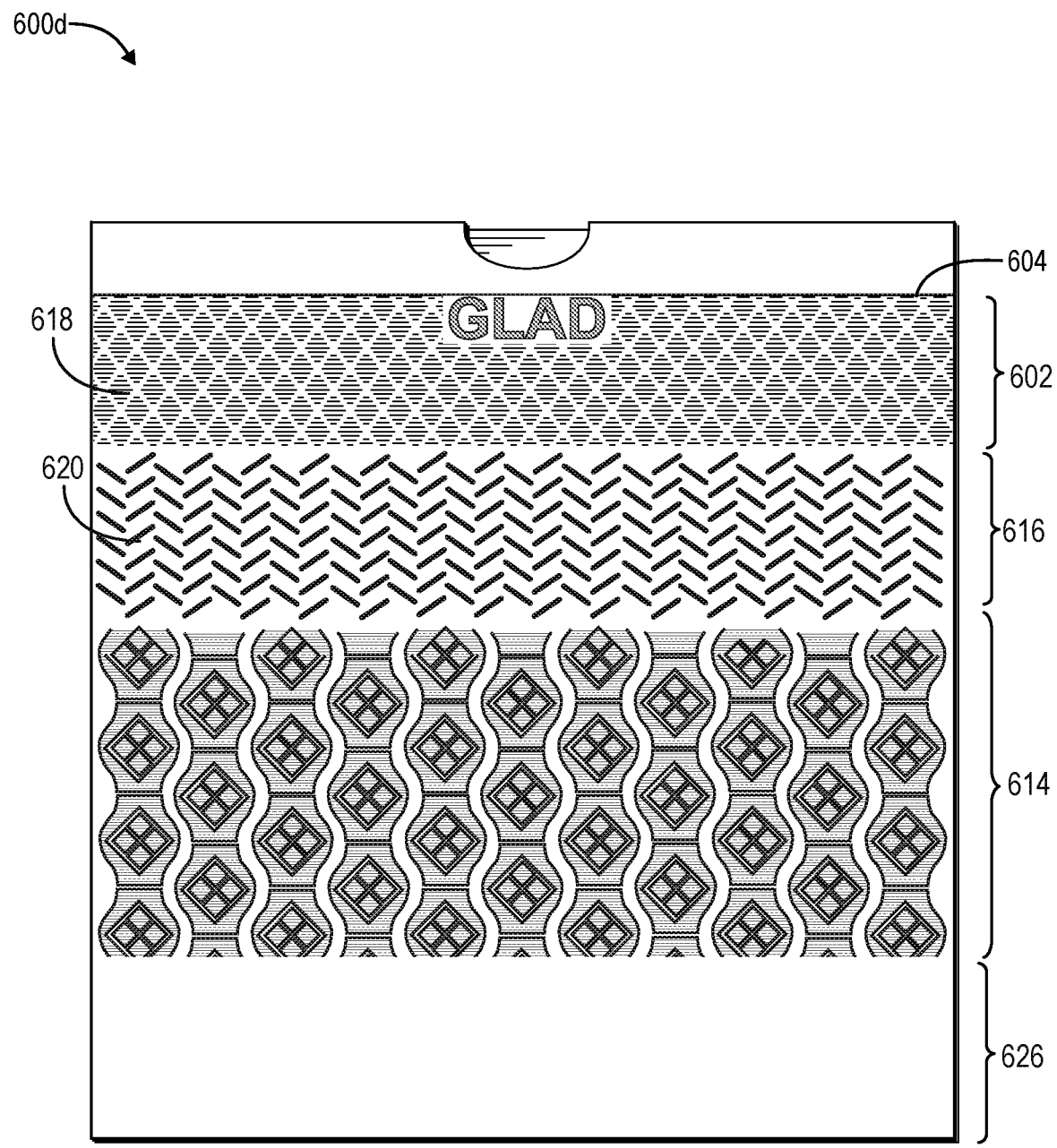

For example, FIG. 6D shows the thermoplastic bag 600d with a third region 616 with contact areas in a second pattern 620 positioned under the grab zone rather than at the bottom of the bag as shown in FIG. 6C. In one or more implementations, the first pattern 618 of raised rib-like elements may serve to increase the tactile cues of strength and durability, while the second pattern 620 of contact areas may serve to increase the visual cues of strength and durability. As shown, the thermoplastic bag 600d in FIG. 6D includes a second region 614 of deformations, as discussed above, and a fourth region 626 of flat and undeformed portions of film adjacent to the bottom of the multi-film thermoplastic bag 600d.

In some implementations, the multiple areas of raised rib-like elements or contact areas can be formed into patterns including alpha-numeric characters. For example, as further shown in FIG. 6D, the multiple areas of contact areas formed into words (e.g., "GLAD"). In other implementations, the multiple areas of raised rib-like elements can be formed into words including brand names, claims, and instructions.

Although FIGS. 5A-6D show regions of raised rib-like elements (e.g., grab zones) in various configurations, additional configurations of raised rib-like elements are possible. For example, a thermoplastic bag can include a single continuous region of raised rib-like elements (e.g., extending from the top of the thermoplastic bag to the bottom of the thermoplastic bag). In another implementation, a thermoplastic bag can include multiple strips of raised rib-like elements spaced by flat and undeformed regions. In other implementations, a thermoplastic bag can include regions and/or grab zones of raised rib-like elements in any configuration.

Figure 7:
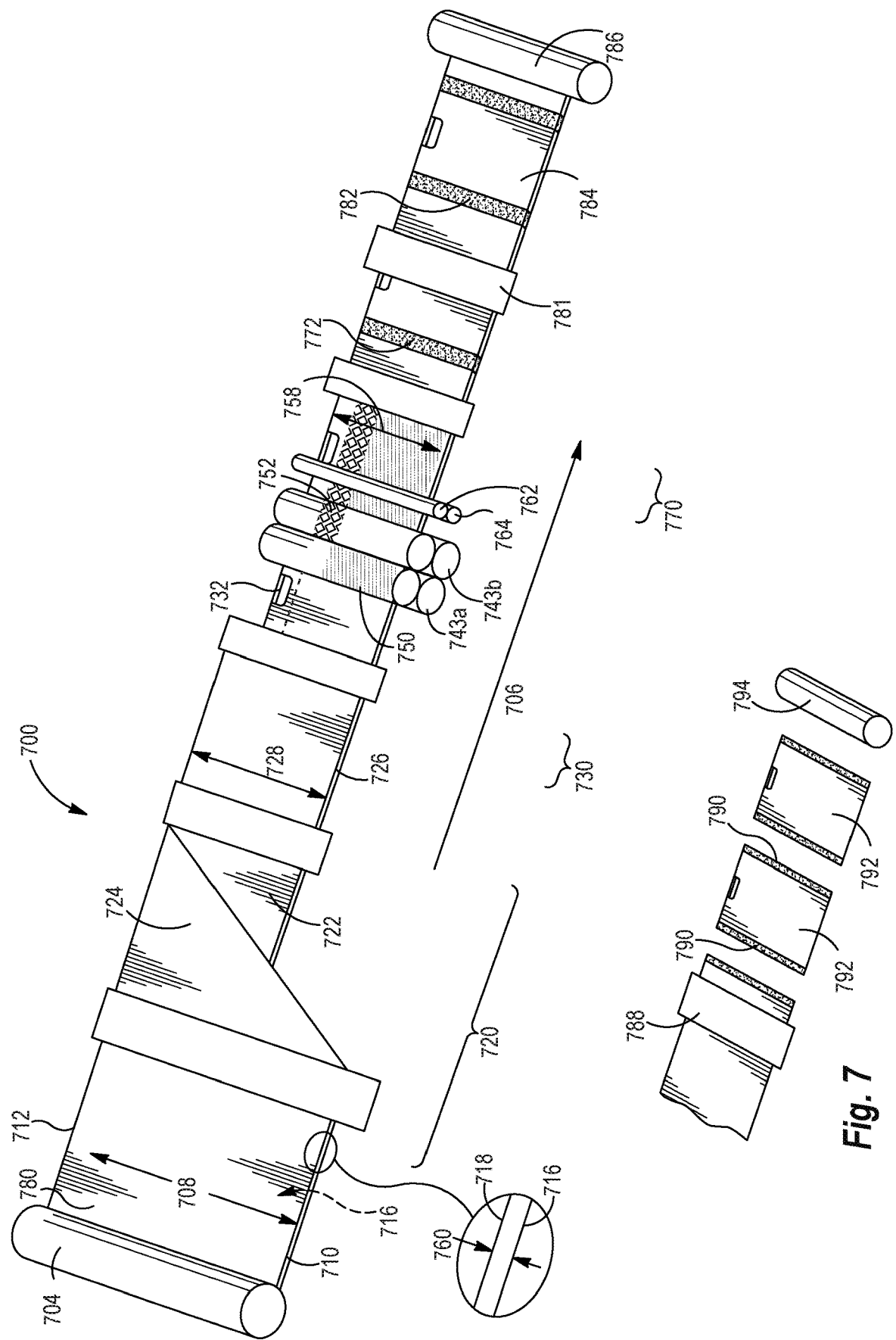
FIG. 7 illustrates a schematic diagram of a process of manufacturing a thermoplastic bag including a hem skirt laminated to the sidewalls via a SELFing process in accordance with one or more implementations of the present disclosure.

To produce a bag having one or more raised rib-like elements that bond a hem skirt to the sidewalls as described, continuous webs of thermoplastic material may be processed through a high-speed manufacturing environment such as that illustrated in FIG. 7. In the illustrated process 700, production may begin by unwinding a first continuous web or film 780 of thermoplastic sheet material from a roll 704 and advancing the web along a machine direction 706. The unwound web 780 may have a width 708 that may be perpendicular to the machine direction 706, as measured between a first edge 710 and an opposite second edge 712. The unwound web 780 may have an initial average thickness 760 measured between a first surface 716 and a second surface 718. In other manufacturing environments, the web 780 may be provided in other forms or even extruded directly from a thermoplastic forming process.

In some implementations, as shown in FIG. 8, the illustrated process 700a involves unwinding a second continuous web or film 782 of thermoplastic sheet material from a roll 702 and advancing the web along a machine direction 706. The second film 782 can comprise a thermoplastic material, a width, and/or a thickness that is similar or the same as the first film 780. In alternative one or more implementations, one or more of the thermoplastic material, width, and/or thickness of the second film 782 can differ from that of the first film 780. To provide the first and second sidewalls of the finished bag, the films 780, 782 may be folded into a first half 722 and an opposing second half 724 about the machine direction 706 by a folding operation 720. When so folded, the first edge 710 may be moved adjacent to the second edge 712 of the web. Accordingly, the width of the films 780, 782 proceeding in the machine direction 706 after the folding operation 720 may be a width 728 that may be half the initial width 708. As may be appreciated, the portion mid-width of the unwound films 780, 782 may become the outer edge of the folded films 780, 782. In any event, a hem channel may be formed by folding adjacent first and second edges 710, 712 over (e.g., at a top edge) and a draw tape 732 may be inserted into the hem channel during a hem channel and draw tape operation 730. In some implementations, as shown in FIGS. 7 and 8, the hem channel and draw tape operation 730 may fold over a length of the first and second edges 710, 712 such that a hem skirt is formed (e.g., indicated by the dashed line following the operation 730) down an inner surface of the multi-film thermoplastic bag.

To form one or more regions of raised rib-like elements in a multi-film thermoplastic bag, the processing equipment may include at least one set of intermeshing rollers 743a (e.g., SELF'ing rollers) that impart a first pattern 750 of raised rib-like elements in one portion, zone, area, or section of the resulting multi-film thermoplastic bag. As discussed above, the set of intermeshing rollers 743a form the pattern 750 through one or more layers of the multi-film thermoplastic bag, as well as through a hem skirt extending down an inner surface of the multi-film thermoplastic bag. Referring to FIG. 7, the folded web 780 may also be advanced along the machine direction 706 between intermeshing rollers 743b (e.g., SELF'ing rollers), which impart a second pattern 752 of raised rib-like elements in that bond the hem skirt to the sidewalls as described above.

To avert imparting a pattern (e.g., of raised rib-like elements or otherwise) onto the portion of the web that includes the draw tape 732, the corresponding ends of the rollers 743a, 743b may be smooth and without ridges, grooves, punch elements, or die elements. Thus, the adjacent edges 710, 712 and the corresponding portion of the web proximate those edges that pass between the smooth ends of the rollers 743a, 743b may not be imparted with any pattern. In alternative implementations, the intermeshing rollers (if present) and the contact rollers are positioned prior to the draw tape insertion process.

The processing equipment may include pinch rollers 762, 764 to accommodate the width 758 of the web 780. Additionally, in at least one implementation, the processing equipment spools the bag 784 and other bags produced by the processing equipment into a roll 786 for further processing, or for provision to the end user.

To produce the finished bag, the processing equipment may further process the folded web with at least one region of contact areas. For example, to form the parallel side edges of the finished multi-film thermoplastic bag, the web may proceed through a sealing operation 770 in which heat seals 772 may be formed between the folded edge 726 and the adjacent edges 710, 712. The heat seals may fuse together the adjacent halves 722, 724 of the folded web. The heat seals 772 may be spaced apart along the folded web and in conjunction with the folded outer edge 726 may define individual bags. The heat seals may be made with a heating device, such as, a heated knife. A perforating operation 781 may perforate the heat seals 772 with a perforating device, such as, a perforating knife so that individual bags 792 may be separated from the web. In one or more implementations, the webs may be folded one or more times before the folded webs may be directed through the perforating operation. The web 780 embodying the bags 792 may be wound into a roll 794 for packaging and distribution. For example, the roll 794 may be placed in a box or a bag for sale to a customer.

In one or more implementations of the process, a cutting operation 788 may replace the perforating operation 781. The web is directed through a cutting operation 788 which cuts the webs at location 790 into individual bags 792 prior to winding onto a roll 794 for packaging and distribution. For example, the roll 794 may be placed in a box or bag for sale to a customer. The bags may be interleaved prior to winding into the roll 794. In one or more implementations, the web may be folded one or more times before the folded web is cut into individual bags 792. In one or more implementations, the bags 792 may be positioned in a box or bag, and not onto the roll 794.

FIG. 8 illustrates a modified high-speed manufacturing 700a that involves unwinding a second continuous web or film 782 of thermoplastic sheet material from a roll 702 and advancing the web along a machine direction 706. The second film 782 can comprise a thermoplastic material, a width, and/or a thickness that is similar or the same as the first film 780. In alternative one or more implementations, one or more of the thermoplastic material, width, and/or thickness of the second film 782 can differ from that of the first film 780. The films 780, 782 can be folded together during the folding operation 720 such that they pass through the SELF'ing rollers 743c to form regions of deformations including raised rib-like elements extending through layers of the resulting multi-filmed thermoplastic bags.

As shown by FIG. 8, the SELF'ing rollers 743c can comprise hybrid rollers with a first portion 756 that form a first pattern of raised rib-like elements and a second portion 754 that form a second pattern of raised rib-like elements. Furthermore, the SELF'ing rollers 743c are shown after the draw tape insertion process that also forms a hem skirt (e.g., indicated by the dashed line) by folding over a length of the first and second edges 710, 712. As mentioned above, passing layers of the first film 780 and the second film 782 between the SELF'ing rollers 743c creates patterns of raised rib-like elements in a least one region between flat portions of the films 780, 782 and a hem skirt extending down an inner surface of the films 780, 782, where the one or more raised rib-like elements also extend from the hem channel over the hem skirt and toward bottom edges of the films 780, 782. in alternative implementations the SELF'ing rollers 743c can be positioned after the folding operation 720 or another position in the process 700a. For example, FIGS. 7 and 8 illustrate the rollers 743a, 743b, and 743c being position after the folding operation 720. In alternative implementations, the rollers 743a, 743b, 743c can be positioned before the folding operation 720. When positioned after the folding operation 720, one or more of the rollers 743a, 743b, 743c can create patterns of raised rib-like elements on opposing sides of the bag that are mirror images of each other. The present disclosure may be embodied in other specific forms without departing from its spirit or essential characteristics. Thus, the described implementations are to be considered in all respects only as illustrative and not restrictive. The scope of the disclosure is, therefore, indicated by the appended claims rather than by the foregoing description. All changes that come within the meaning and range of equivalency of the claims are to be embraced within their scope.

We claim:

1. A thermoplastic bag comprising:
opposing thermoplastic film sidewalls each comprising:
a folded over top portion extending down an inner surface of the thermoplastic bag and forming a hem channel;
a hem skirt extending from the hem channel toward a bottom of the thermoplastic bag; and
a region comprising a plurality of raised rib-like elements in a strainable network and devoid of contact areas, the plurality of raised rib-like elements bonding the hem skirt to the inner surface of the thermoplastic bag and providing the region with increased elasticity compared to portions of the thermoplastic film sidewall lacking the plurality of raised rib-like elements;
wherein each plurality of raised rib-like elements is configured to cause one of the hem skirts to separate from the respective thermoplastic film sidewall before the respective thermoplastic film sidewall fails when subjected to a force.

2. The thermoplastic bag as recited in claim 1, wherein each of the thermoplastic film sidewalls comprises at least two separate thermoplastic films.

3. The thermoplastic bag as recited in claim 2, wherein the plurality of raised rib-like elements of each thermoplastic film sidewall secures the at least two separate thermoplastic films and the respective hem skirt together.

4. The thermoplastic bag as recited in claim 1, wherein:
each hem skirt comprises at least two separate thermoplastic films; and
the plurality of raised rib-like elements of a first sidewall secure the at least two separate thermoplastic films of the first sidewall and the at least two separate thermoplastic films of the hem skirt together.

5. The thermoplastic bag as recited in claim 1, wherein each plurality of raised rib-like elements comprises deformations of the opposing thermoplastic film sidewalls and respective hem skirts.

6. The thermoplastic bag as recited in claim 1, wherein:
each of the thermoplastic film sidewalls further comprises a hem seals; and
each plurality of raised rib-like elements on a thermoplastic film sidewall is positioned between one of the hem seals and the bottom of the thermoplastic bag.

7. The thermoplastic bag as recited in claim 6, wherein bonding of one of the hem skirts to the inner surface of the thermoplastic bag by one of the pluralities of raised rib-like elements reinforces one of the hem seals.

8. The thermoplastic bag as recited in claim 1, wherein:
each plurality of raised rib-like elements comprises a first pattern of raised rib-like elements extending a first length toward a bottom of the thermoplastic bag from one of the hem channels; and
the thermoplastic bag comprises a second pattern of raised rib-like elements extending a second length from an end of the first pattern of raised rib-like elements toward the bottom of the thermoplastic bag.

9. The thermoplastic bag as recited in claim 8, wherein:
each of the thermoplastic film sidewalls further comprises flat and undeformed portions lacking raised rib-like elements; and
the flat and undeformed portions of the thermoplastic film sidewalls separate the first pattern of raised rib-like elements and the second pattern of raised rib-like elements.

10. The thermoplastic bag as recited in claim 9, wherein the first pattern of raised rib-like elements is different from the second pattern of raised rib-like elements.

11. The thermoplastic bag as recited in claim 1, wherein each plurality of raised rib-like elements extends a first length from the respective hem channel toward the bottom of the thermoplastic bag, wherein the first length is smaller than a length of the thermoplastic film sidewalls.

12. A multi-film thermoplastic bag comprising:
first and second opposing sidewalls joined together along a first side edge, an opposite second side edge, and a closed bottom edge;
a hem channel extending along a top edge of each of the first and second opposing sidewalls; and
a respective hem skirt extending down an inner surface of each of the first and second opposing sidewalls of the multi-film thermoplastic bag from the respective hem channel toward the closed bottom edge; and
a region comprising a plurality of raised rib-like elements in a strainable network and devoid of contact areas, the plurality of raised rib-like elements bonding the hem skirt to the inner surface of the multi-film thermoplastic bag and providing the region with increased elasticity compared to portions of the multi-film thermoplastic bag lacking the plurality of raised rib-like elements.

13. The multi-film thermoplastic bag as recited in claim 12, wherein:
the first opposing sidewall comprises a first layer of thermoplastic film and a second layer of thermoplastic film; and
the second opposing sidewall comprises a third layer of thermoplastic film and a fourth layer of thermoplastic film.

14. The multi-film thermoplastic bag as recited in claim 13, further comprising hem seals securing the respective top edge to the first sidewall or second sidewall.

15. The multi-film thermoplastic bag as recited in claim 14, wherein:
the plurality of raised rib-like elements on the first opposing sidewall extends from the respective hem seal a first length; and
the first length is equal to a length of the hem skirt of the first opposing sidewall.

16. The multi-film thermoplastic bag as recited in claim 15, wherein the hem skirt on the first opposing sidewall further comprises:
a flat and undeformed area extending a first distance from the hem seal of the first opposing sidewall; and
the plurality of raised rib-like elements of the first opposing sidewall extending a second distance from the flat and undeformed area.

17. The multi-film thermoplastic bag as recited in claim 14, wherein bonding of the hem skirt of the first opposing sidewall to the inner surface of the first opposing sidewall by the plurality of raised rib-like elements reinforces the hem seals.

* * * * *